(12) United States Patent
Rudyan et al.

(10) Patent No.: US 12,139,644 B2
(45) Date of Patent: *Nov. 12, 2024

(54) DUAL LAP HIGH STRENGTH ADHESIVE FOR SHEET MEMBRANE APPLICATION, HAVING REFLECTIVITY GRANULAR PARTICLE LAYER TO FULLY BOND TO CONCRETE/SHOTCRETE, AND A METHOD OF MAKING, AND USING SAME

(71) Applicant: Amir Rudyan, Canoga Park, CA (US)

(72) Inventors: Amir Rudyan, Agoura Hills, CA (US); Paul Thomas Miller, Valencia, CA (US)

(73) Assignee: Amir Rudyan, Canoga Park, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/839,441

(22) Filed: Jun. 13, 2022

(65) Prior Publication Data

US 2022/0380638 A1 Dec. 1, 2022

Related U.S. Application Data

(63) Continuation-in-part of application No. 17/353,713, filed on Jun. 21, 2021, now Pat. No. 11,692,326, (Continued)

(51) Int. Cl.
*C09J 11/02* (2006.01)
*C09J 7/24* (2018.01)
(Continued)

(52) U.S. Cl.
CPC .............. *C09J 11/02* (2013.01); *C09J 7/243* (2018.01); *C09J 7/38* (2018.01); *C09J 7/403* (2018.01);
(Continued)

(58) Field of Classification Search
CPC .............. B32B 13/12; B32B 2307/416; B32B 2307/7265; B32B 2307/732;
(Continued)

(56) References Cited

U.S. PATENT DOCUMENTS 8,453,405 B2 6/2013 Wiercisnki et al.
8,713,879 B2 5/2014 Wiercisnki et al.
(Continued)

*Primary Examiner* — Lawrence D Ferguson
(74) *Attorney, Agent, or Firm* — Aziz M. Ahsan; AHSAN & ASSOCIATES, PLLC

(57) ABSTRACT

A dual lap high strength adhesive for sheet membrane application, having reflectivity granular particle layer to fully bond to concrete/shotcrete, and a method of making, and using same. More particularly, the invention encompasses a below grade, blind side, waterproofing sheet membrane with an inventive high strength adhesive, and having at least one layer of reflectivity granular particle layer that are partly embedded into the adhesive layer, and where the average reflectivity of the exposed granular particles is below 55 percent reflectivity on a standard reflectivity scale. The innovative reflectivity granular particle layer system that is securely bonded to concrete or shotcrete can be used along a wall, a floor, a ceiling, or along any structure which requires water or moisture proofing. The inventive high strength adhesive is along at least one edge of the sheet membrane, and could also be used to embed the reflectivity granular particle.

22 Claims, 10 Drawing Sheets

Related U.S. Application Data which is a continuation-in-part of application No. 16/933,875, filed on Jul. 20, 2020, now Pat. No. 11,566,396.

(60) Provisional application No. 62/932,455, filed on Nov. 7, 2019.

(51) Int. Cl.
*C09J 7/38* (2018.01)
*C09J 7/40* (2018.01)

(52) U.S. Cl.
CPC .... *C09J 2301/124* (2020.08); *C09J 2301/302* (2020.08); *C09J 2301/408* (2020.08)

(58) Field of Classification Search
CPC .......... B32B 2307/748; B32B 2419/00; B32B 27/08; B32B 27/32; B32B 3/30; B32B 7/06; B32B 7/12; C08K 3/013; C09J 11/02; C09J 2203/346; C09J 2301/124; C09J 2301/302; C09J 2301/408; C09J 2301/41; C09J 2423/006; C09J 2423/046; C09J 7/243; C09J 7/29; C09J 7/38; C09J 7/403; E02D 31/004; E02D 31/04; E02D 31/10; E04B 1/0007; E04B 1/665; E04B 1/6806

See application file for complete search history.

(56) References Cited

U.S. PATENT DOCUMENTS

| | | |
|---|---|---|
| 8,793,862 B2 | 8/2014 | Weber et al. |
| 10,655,322 B2 | 5/2020 | Chen et al. |

DUAL LAP HIGH STRENGTH ADHESIVE FOR SHEET MEMBRANE APPLICATION, HAVING REFLECTIVITY GRANULAR PARTICLE LAYER TO FULLY BOND TO CONCRETE/SHOTCRETE, AND A METHOD OF MAKING, AND USING SAME

CROSS-REFERENCE TO RELATED APPLICATIONS

The instant patent application is a Continuation-In-Part of U.S. Non-Provisional patent application Ser. No. 17/353,713, filed on Jun. 21, 2021, titled "Below Grade, Blind Side, Waterproofing Sheet Membrane With Adhesive And Having Improved Low Reflectivity Granular Particle Layer To Fully Bond To Concrete/Shotcrete, And A Method Of Making, And Using Same", and which patent application was a Continuation-In-Part of U.S. Non-Provisional patent application Ser. No. 16/933,875, filed on Jul. 20, 2020, titled "Below Grade, Blind Side, Waterproofing Sheet Membrane With Adhesive And Low Reflectivity Granular Particle Layer To Fully Bond To Concrete/Shotcrete, And A Method Of Making, And Using Same", and which patent application claimed priority to and the benefit of U.S. Provisional Patent Application Ser. No. 62/932,455, filed on Nov. 7, 2019, titled "Below Grade, Blind Side, Waterproofing Sheet Membrane With Adhesive And Low Reflectivity Granular Particle Layer To Fully Bond To Concrete/Shotcrete, And A Method Of Making, And Using Same," the entire disclosure of each application is incorporated herein by reference.

FIELD OF THE INVENTION

The present invention relates generally to a dual lap high strength adhesive for sheet membrane application, having reflectivity granular particle layer to fully bond to concrete/shotcrete, and a method of making, and using same. More particularly, the invention encompasses a below grade, blind side, waterproofing sheet membrane with an inventive high strength adhesive, and having at least one layer of reflectivity granular particle layer that are partly embedded into the adhesive layer, and where the average reflectivity of the exposed granular particles is below 55 percent reflectivity on a standard reflectivity scale. The innovative reflectivity granular particle layer system that is securely bonded to concrete or shotcrete can be used along a wall, a floor, a ceiling, or along any structure which requires water or moisture proofing. The invention can be most effectively used between a concrete or shotcrete layer and the surrounding earth, such as, along an area that has a high-water table, or a constant hydrostatic pressure, or high ground moisture, that may creep into a foundation or a wall. The inventive waterproofing layer having the waterproofing sheet membrane, and a high strength adhesive layer having embedded therein with reflectivity granular particles can be used in any building or wall construction, and can be placed under or around a foundation of a building or dwelling or on its below grade blind side retaining walls, etc. For some applications the inventive high strength adhesive is only along at least one edge of the sheet membrane. However, for some applications the complete sheet membrane would have the inventive high strength adhesive, including embedding the reflectivity granular particle layer in the inventive high strength adhesive.

BACKGROUND INFORMATION

Water or moisture penetration into a structure has have been known in the water proofing industry for many years, and the water proofing industry has addressed this well-known problem in a variety of ways, and which are well known to the people skilled in the art.

U.S. Pat. No. 8,453,405, to Robert A. Wiercisnki, et al., the disclosure of which is incorporated herein by reference discloses a waterproofing membrane that bonds to concrete cast against it (i.e., post-cast concrete). The membrane includes a flexible carrier sheet, a pressure sensitive adhesive and reflective particles on the surface of the adhesive. The reflective particles should have an average diameter equal to or greater than the thickness of the pressure sensitive adhesive. Preferably, the reflective particles are ground white cement, ground hydrated white cement, ground partially-hydrated white cement or a mixture of two or more of these. The membrane does not have a removable release sheet that is typically used to prevent the adhesive portion of the membrane from adhering to the carrier sheet or other portion of the membrane when the membrane is rolled up.

U.S. Pat. No. 8,713,879, to Robert A. Wiercisnki, et al., the disclosure of which is incorporated herein by reference discloses a waterproofing membrane that bonds to concrete cast against it (i.e., post-cast concrete). The membrane includes a flexible carrier sheet, a pressure sensitive adhesive, and reflective particles on the surface of the adhesive. The reflective particles should have an average diameter equal to or greater than the thickness of the pressure sensitive adhesive. Preferably, the reflective particles are ground white cement or ground white hydrated cement. The membrane does not have a removable release sheet that is typically used to prevent the adhesive portion of the membrane from adhering to the carrier sheet or other portion of the membrane when the membrane is rolled up.

U.S. Pat. No. 8,793,862 to Ulrich K. Weber, et al., the disclosure of which is incorporated herein by reference discloses a sealant which is arranged in a meshlike manner between a composite layer and a barrier layer in a watertight membrane that includes a barrier layer and a composite layer. In the case of a leak in the barrier layer, the network of sealant between the composite layer and the barrier layer prevents the barrier layer from being affected. As a result, the size of the areas affected by penetrating water is limited. The damage by the penetrating water is thus limited to a smaller area, and the point of damage can thus be more easily localized.

U.S. Pat. No. 10,655,322, to Huhe Chen, et al., the disclosure of which is incorporated herein by reference discloses a waterproofing membrane which does not require a removable release sheet but which nevertheless bonds to post-cast concrete and facilitates water-tight sealing at membrane-to-membrane overlaps. The waterproofing membrane comprises a carrier and pressure-sensitive adhesive (PSA) layers, an inorganic particle layer having particulate bodies which are partially embedded in the PSA and which have an average particle size less than the average thickness of the PSA layer, and an anti-submarining nano-silica-containing coating layer attached to un-embedded portions of the inorganic particles to prevent total embedding into the PSA when the membrane is rolled or unrolled, whereby water-tight seams are facilitated between overlapped portions of adjacently installed waterproofing membranes, and whereby the water-tight seam is achieved preferably using only detailing or waterproofing tape and without the additional use of a liquid primer, mastic, or other coating.

However, this invention improves on the deficiencies of the prior art and provides an inventive dual lap high strength adhesive for sheet membrane application, having reflectivity granular particle layer to frilly bond to concrete/shotcrete, and a method of making, and using same.

PURPOSES AND SUMMARY OF THE INVENTION

The invention is a dual lap high strength adhesive for sheet membrane application, having reflectivity granular particle layer to fully bond to concrete/shotcrete, and a method of making, and using same.

Therefore, one purpose of this invention is to provide an inventive dual lap high strength adhesive for sheet membrane application, having reflectivity granular particle layer to fully bond to concrete/shotcrete, and a method of making, and using same.

Another purpose of this invention is to provide a novel dual lap high strength adhesive for sheet membrane application, having reflectivity granular particle layer to fully bond to concrete/shotcrete, and a method of making, and using same, and wherein reflectivity of the at least one layer of at least one reflectivity granular particle layer is below 55 percent reflectivity.

Yet another purpose of this invention is to provide a novel dual lap high strength adhesive for sheet membrane application, having reflectivity granular particle layer to fully bond to concrete/shotcrete, and a method of making, and using same, and wherein the inventive waterproofing layer having a waterproofing sheet membrane, and an adhesive layer having embedded therein and having reflectivity granular particles embedded therein has dual release liners or sheets protecting a first high strength adhesive layer, and a second high strength adhesive layer.

Still yet another purpose of this invention is to provide a novel dual lap high strength adhesive for sheet membrane application, having reflectivity granular particle layer to fully bond to concrete/shotcrete, and a method of making, and using same, and wherein the inventive waterproofing layer having a waterproofing sheet membrane, and an adhesive layer having embedded therein and having reflectivity granular particles embedded therein has dual release liners or sheets protecting a first high strength adhesive layer, and a second high strength adhesive layer, and where a first release liner or sheet protects the first high strength adhesive layer which is on the first or top or upper portion of the inventive waterproofing layer having a waterproofing sheet membrane, and an adhesive layer having embedded therein and having reflectivity granular particles embedded therein, and a second release liner or sheet protects the second high strength adhesive layer which is on the second or bottom or lower portion of the inventive waterproofing layer having a waterproofing sheet membrane, and an adhesive layer having embedded therein and having reflectivity granular particles embedded therein.

Still yet another purpose of this invention is to provide at least one waterproof barrier layer having reflectivity granular particles embedded therein via at least one of a standard adhesive and a high strength adhesive to form a bond with a concrete or shotcrete layer.

Therefore, in one aspect this invention comprises a below grade, blind side, waterproofing sheet membrane with adhesive and reflectivity granular particle layer to fully bond to concrete/shotcrete, comprising:
(a) at least one sheet membrane having a first membrane surface, and a second membrane surface;
(b) at least one first adhesive layer having a first adhesive surface, and a second adhesive surface, and wherein said second adhesive surface is in secure contact with at least a portion of said first membrane surface;
(c) at least one layer of at least one reflectivity granular particle layer, having a first particle layer surface, and a second particle layer surface, and wherein said second particle layer surface is in secure contact with at least a portion of said first adhesive surface, and wherein reflectivity of said at least one layer of at least one reflectivity granular particle layer is below 55 percent reflectivity; and
(d) wherein at least a portion of said at least one sheet membrane has at least one layer of a high strength adhesive.

In another aspect this invention comprises a method of forming a below grade, blind side, waterproofing sheet membrane with adhesive and reflectivity granular particle layer to fully bond to concrete/shotcrete, comprising the steps of:
(a) taking at least one sheet membrane having a first membrane surface, and a second membrane surface;
(b) applying at least one first adhesive layer having a first adhesive surface, and a second adhesive surface, onto said at least one sheet membrane, and wherein said second adhesive surface is in secure contact with at least a portion of said first membrane surface;
(c) applying at least one layer of at least one reflectivity granular particle layer, having a first particle layer surface, and a second particle layer surface, over at least a portion of said at least one first adhesive layer, and wherein said second particle layer surface is in secure contact with at least a portion of said first adhesive surface, and wherein reflectivity of said at least one layer of at least one reflectivity granular particle layer is below 55 percent reflectivity; and
(d) wherein at least a portion of said at least one sheet membrane has at least one layer of a high strength adhesive.

In yet another aspect this invention comprises a method of forming a below grade, blind side, waterproofing sheet membrane with adhesive and reflectivity granular particle layer to fully bond to concrete/shotcrete, comprising the steps of:
(a) taking the waterproofing sheet membrane with adhesive and reflectivity granular particle layer of this invention, and placing it against at least one structure, such that said second membrane surface of said at least one sheet membrane is in physical contact with said at least one structure, and wherein said first particle layer surface of said at least one layer of at least one reflectivity granular particle layer is exposed;
(b) applying at least one layer of one of concrete and shotcrete over at least a portion of said first particle layer surface of said at least one layer of at least one reflectivity granular particle layer; and
(c) wherein at least a portion of said at least one sheet membrane has at least one layer of a high strength adhesive.

DETAILED DESCRIPTION

Figure 1:
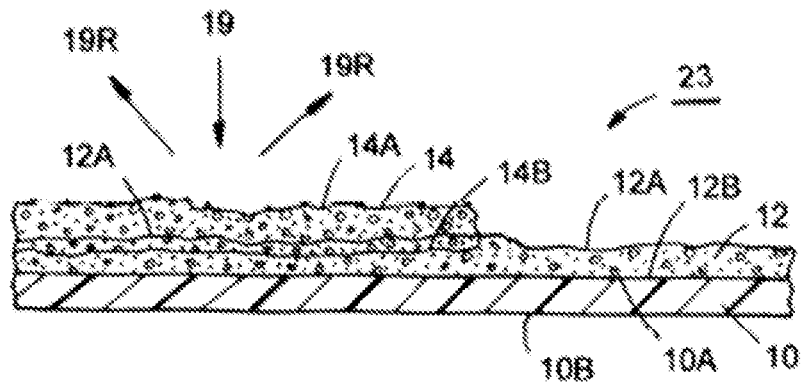
FIG. 1, illustrates a first embodiment of the inventive below grade, blind side, waterproofing sheet membrane with adhesive and reflectivity granular particle layer to fully bond to concrete/shotcrete.

The inventive dual lap high strength adhesive for sheet membrane application, having reflectivity granular particle layer to fully bond to concrete/shotcrete, and a method of making, and using same will now be discussed with reference to FIGS. 1 through 31. Although the scope of the present invention is much broader than any particular embodiment, a detailed description of the preferred embodiment follows together with drawings. These drawings are for illustration purposes only and are not drawn to scale. Like numbers represent like features and components in the drawings.

In summary the invention is an inventive dual lap high strength adhesive for sheet membrane application, having reflectivity granular particle layer to fully bond to concrete/shotcrete, and a method of making, and using same in a building or wall construction, and placing it under and around a foundation of a building or dwelling or on its below grade blind side retaining walls, etc.

FIG. 1, illustrates a first embodiment of the inventive below grade, blind side, waterproofing sheet membrane with adhesive and reflectivity granular particle layer to fully bond to concrete/shotcrete 23, where the sheet membrane or layer 10, having a first or top or upper surface 10A, and a second or lower or bottom surface 10B, has secured thereto at least one layer of at least one first adhesive 12, such that the first adhesive layer 12, has a first or top or upper surface 12A, and a second or lower or bottom surface 12B, and wherein the first surface 10A, of the sheet membrane 10, is in secure contact with the second surface 12B, of the first adhesive layer 12. At least one layer of at least one reflectivity granular particle layer 14, having a first or top or upper surface 14A, and a second or lower or bottom surface 14B, is in secure contact with the first adhesive layer 12, such that the first surface 12A, of the first adhesive layer 12, is in secure contact with the second surface 14B, of the at least one reflectivity granular particle layer 14, and this combination forms the inventive waterproofing sheet membrane with adhesive and reflectivity granular particle layer 23. For some applications portions of the at least one reflectivity granular particle layer 14, could be partially or fully embedded within the at least one first adhesive layer 12. Similarly, for some applications the second surface 14B, of the at least one reflectivity granular particle layer 14, could be below the planar surface of the first surface 12A, of the at least one first adhesive layer 12. The sheet membrane 10, can be made from a material 10, selected from a group comprising a high-density polyethylene (HDPE) material, a thermoplastic polyolefin (TPO) material, and combinations thereof, to name a few. The thickness of the sheet membrane 10, is preferably between about 0.50 mm to about 3.50 mm. As shown in FIG. 1, incoming light 19, is reflected or distributed as reflected light 19R. The angle of reflection depends on how the reflection 19R, is being measured, and thus the inventor has defined an average reflectivity range, and not the method or the instrument being used to observe the reflectivity of the reflectivity granular particle layer 14, on the surface 14A. The at least one layer of at least one reflectivity granular particle layer 14, can be selected from a group comprising of sand, partially hydrated cement granules, such as, made of gray cement, or a white cement that has been tinted or dyed to provide a darker color or reflectivity, tinted granules, gray sand, black sand, red sand, and combinations thereof, to name a few, and where the average reflectivity of the granular particle layer 14, is below, for example, 50 or 55 percent reflectivity, and preferably between about 35 percent to about 50 percent reflectivity, and more preferably between about 35 percent to below 55 percent reflectivity so as to form the inventive reflectivity granular particle layer 14. For some applications, to reduce the average reflectivity below, for example, below 50 or 55 percent average reflectivity, one could tint or dye or color the granules particles 14, such as, for example, the reflectivity granular particle layer 14, could be, for example, a blue color, a gray color, and combinations thereof, to name a few. It should be understood that the average reflectivity test as used herein is an average reflectivity test that will be conducted over the surface having the at least one reflectivity granular particle layer 14, of the inventive sheet membrane 23, since the gray particles 14, are over it, and it is possible that there may be some variance in the location reflectivity, which would depend on where the reflectivity test of the inventive sheet membrane 23, i.e., the first or top sheet surface or layer 14A, might not be, for example, uniformly gray, or uniformly tinted, etc. Thus, it is possible that in production one could have lighter and darker spots on the inventive sheet membrane 23, however, the average reflectivity of the top or upper surface 14A, should be below, for example, below 50 or 55 percent reflectivity, and preferably between about 35 percent reflectivity, to below 50 or 55 percent reflectivity. The inventive reflectivity granular particle layer 14, provides several advantages, and benefits, such as, for example, they provide a visible contrast during construction of a floor 42, or wall 44, allowing for easier detection of punctures, tears, holes, or other irregularities, to name a few. Another benefit of the inventive sheet membrane 23, is that the reflective surface 14A, makes it easier on the eyes of the construction crew who are applying or installing the inventive sheet membrane 23, in the field, in comparison to working with a bright white surface, which is similar to working in a bright light, such as, for example, working in the snow.

Figure 2:
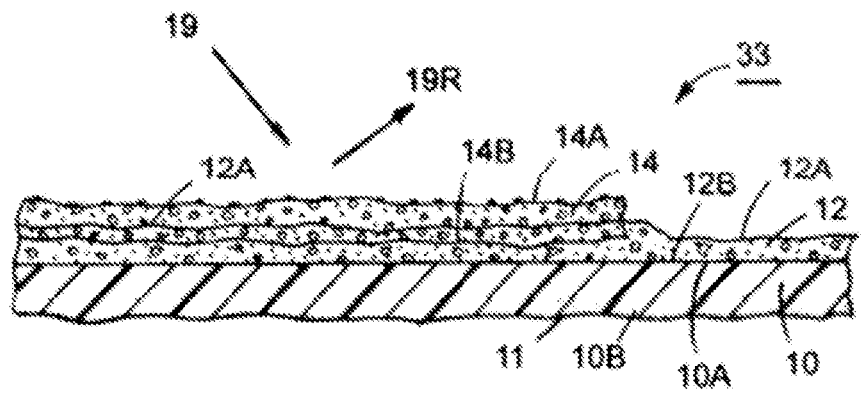
FIG. 2, illustrates a second embodiment of the inventive below grade, blind side, waterproofing sheet membrane with adhesive and reflectivity granular particle layer to fully bond to concrete/shotcrete.

FIG. 2, illustrates a second embodiment of the inventive below grade, blind side, waterproofing sheet membrane with adhesive and reflectivity granular particle layer to fully bond to concrete/shotcrete 33, which is similar to the first embodiment 23, but, wherein the second surface 10B, of the sheet membrane 10, is provided with a surface 11, and wherein the surface 11, can be selected from a group comprising, texture, light texture, embossed, lightly embossed, undulating, and combinations thereof, to name a few.

Figure 3:
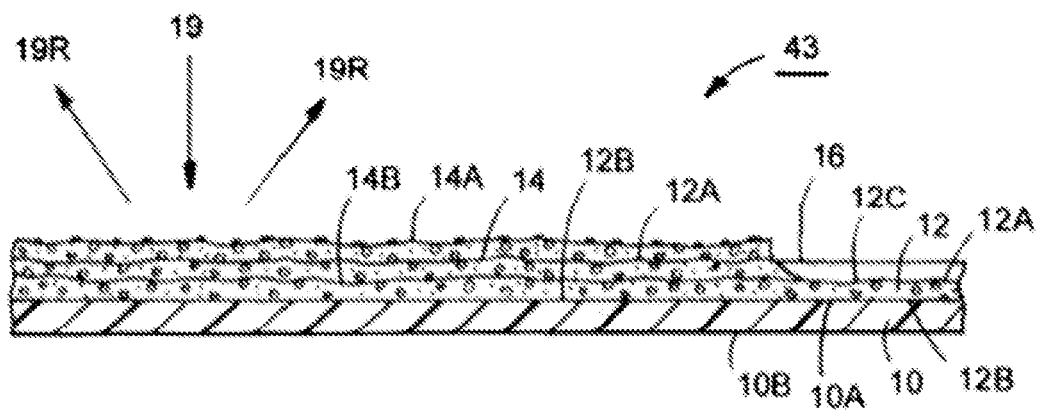
FIG. 3, illustrates a third embodiment of the inventive below grade, blind side, waterproofing sheet membrane with adhesive and reflectivity granular particle layer to fully bond to concrete/shotcrete.

FIG. 3, illustrates a third embodiment of the inventive below grade, blind side, waterproofing sheet membrane with adhesive and reflectivity granular particle layer to fully bond to concrete/shotcrete 43, which is similar to the first embodiment 23, but, wherein a layer portion 12C, of the first adhesive layer 12, does not have the at least one layer of at least one reflectivity granular particle layer 14, over the first surface 12A, and where the layer portion 12C, could be covered or protected with at least one first or top removable release layer or sheet 16, which release sheet 16, is removed, as needed, during installation or application of the inventive waterproofing sheet membrane with adhesive and reflectivity granular particle layer 43. It is preferred that the layer portion 12C, is along at least one edge of the first adhesive layer 12, and preferably along a factory edge 12C, such as, a selvedge 12C.

Figure 4:
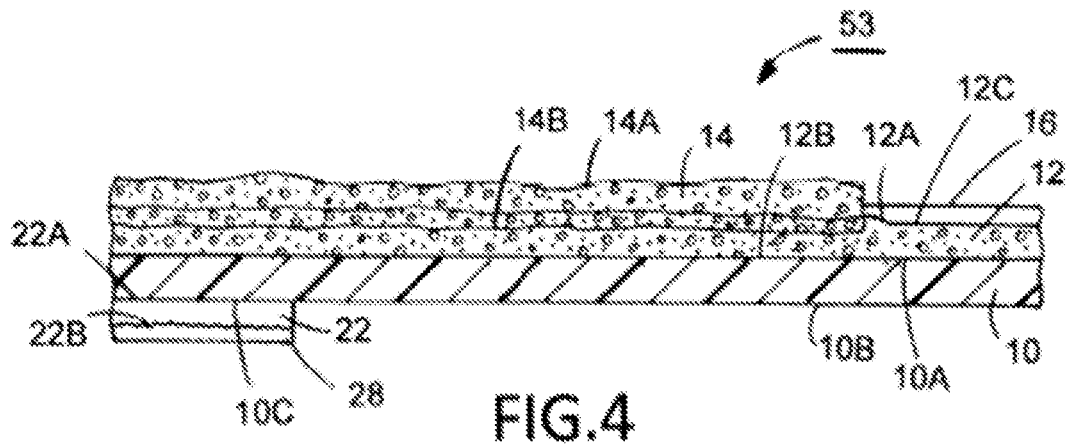
FIG. 4, illustrates a fourth embodiment of the inventive below grade, blind side, waterproofing sheet membrane with adhesive and reflectivity granular particle layer to fully bond to concrete/shotcrete.

FIG. 4, illustrates a fourth embodiment of the inventive below grade, blind side, waterproofing sheet membrane with adhesive and reflectivity granular particle layer to fully bond to concrete/shotcrete 53, which is similar to the third embodiment 43, and wherein a layer portion 10C, of the membrane 10, has secured thereto, at least one layer of at least one second adhesive layer 22, along a portion of the second surface 10B, in the layer portion or area 10C. The second adhesive layer 22, has a first or top or upper surface 22A, and a second or lower or bottom surface 22B. The second surface 22B, of the second adhesive layer 22, is preferably covered or protected with at least one second or bottom removable release layer or sheet 28, while the surface 22A, of the at least one second adhesive layer 22, is in secure mating contact with the second surface 10B, in the layer portion or area 10C. The at least one second release sheet 28, is removed, as needed, during installation or application of the inventive waterproofing sheet membrane with adhesive and reflectivity granular particle layer 53. It is preferred that the layer portion 10C, is along at least one edge of the membrane layer 10, and preferably along a factory edge 10C, such as, a selvedge 10C.

As one can clearly see in FIG. 4, that the inventive waterproofing layer 53, having a waterproofing sheet membrane, and an adhesive layer having embedded therein and having reflectivity granular particles embedded therein 53, has dual removable release liners or sheets 16, 28, protecting a first adhesive layer 12, and a second adhesive layer 22, and where the first removable release layer or sheet 16, protects the first adhesive layer 12, which is on the first or top or upper portion 12A, of the inventive waterproofing layer 53, having a waterproofing sheet membrane, and an adhesive layer having embedded therein and having reflectivity granular particles embedded therein 53, and a second removable release layer or sheet 28, protects the second adhesive layer 22, which is on the second or bottom or lower portion 10B, of the inventive waterproofing layer 53, having a waterproofing sheet membrane, and an adhesive layer having embedded therein and having reflectivity granular particles embedded therein 53.

Figure 5:
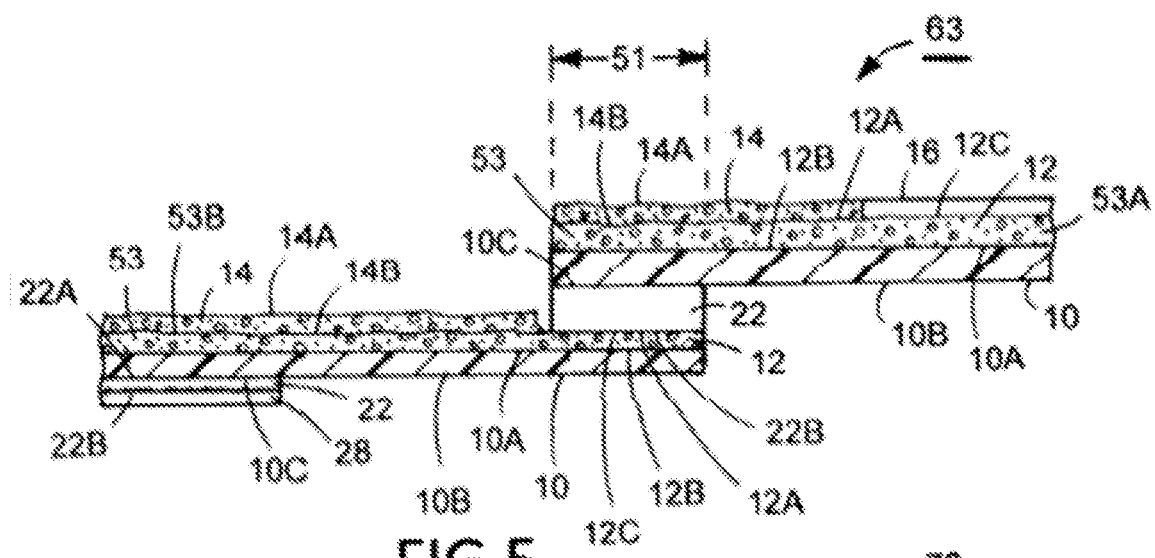
FIG. 5, illustrates a fifth embodiment of the inventive below grade, blind side, waterproofing sheet membrane with adhesive and reflectivity granular particle layer to fully bond to concrete/shotcrete.

FIG. 5, illustrates a fifth embodiment of the inventive below grade, blind side, waterproofing sheet membrane with adhesive and reflectivity granular particle layer to fully bond to concrete/shotcrete 63, which is similar to the fourth embodiment 53. As shown in FIG. 5, the two inventive sheets 53, comprises of a first inventive membrane sheet 53A, and a second inventive membrane sheet 53B, which are joined or mated together, so as to create a "continuous" inventive membrane sheet 53. As shown in FIG. 5, one edge of the first inventive membrane sheet 53A, is secured to another edge of a second inventive membrane sheet 53B. As shown in FIG. 5, the top release sheet 16, of the second inventive sheet 53B, is removed so as to expose at least a portion of the first adhesive layer 12, along the layer portion 12C, and the bottom release sheet 28, of the first inventive membrane sheet 53A, is removed so as to expose at least a portion of the second surface 22B, of the second adhesive layer 22, along the layer portion 10C, and wherein at least a portion of the first adhesive layer 12, of the second inventive sheet 53B, is secured to at least a portion of the second adhesive layer 22, of the first inventive membrane sheet 53A, and thus creating a bond along a length or area or overlap 51.

Figure 6:
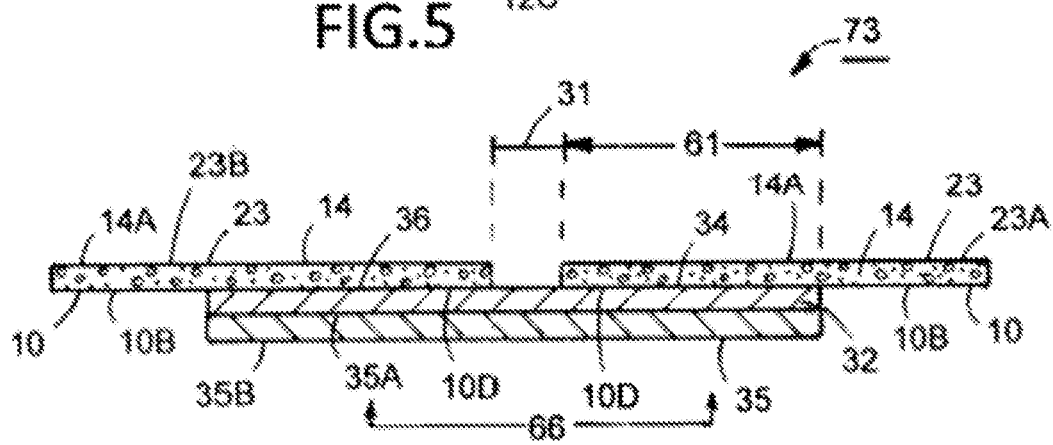
FIG. 6, illustrates a sixth embodiment of the inventive below grade, blind side, waterproofing sheet membrane with adhesive and reflectivity granular particle layer to fully bond to concrete/shotcrete.
Figure 8:
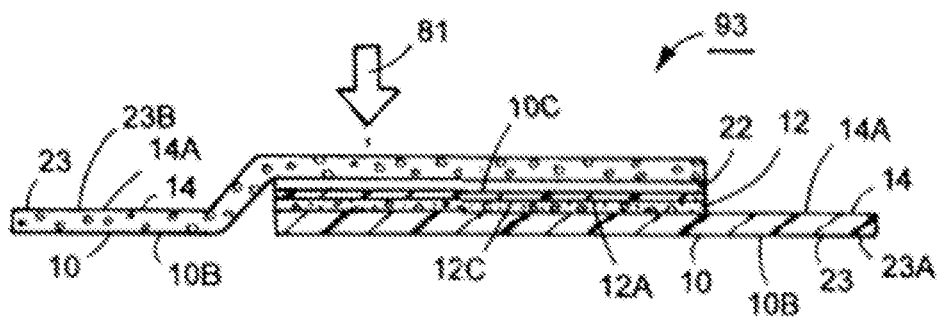
FIG. 8, illustrates a eight embodiment of the inventive below grade, blind side, waterproofing sheet membrane with adhesive and reflectivity granular particle layer to fully bond to concrete/shotcrete.

FIG. 6, illustrates a sixth embodiment of the inventive below grade, blind side, waterproofing sheet membrane with adhesive and reflectivity granular particle layer to fully bond to concrete/shotcrete 73, where one edge of a first inventive sheet membrane 23, is secured to another edge of a second inventive sheet membrane 23. A detail strip 35, having a first or upper or top surface 35A, and a second or lower or bottom surface 35B, is used to secure at least two inventive sheet membranes 23, along a seam or gap 31. As shown in FIG. 6, the two individual inventive sheet membrane 23, comprises of at least one first inventive sheet membrane 23A, and at least one second inventive sheet membrane 23B, that are joined or mated together along an edge or seam 31, so as to create a "continuous" inventive sheet membrane 23. As shown in FIG. 6, a release layer or sheet (not shown) is removed from the upper surface 35A, of the detail strip 35, so as to expose at least one layer of at least one third adhesive layer 32, which has already been secured to an upper or top surface 35A, of the detail strip 35. The second surface 10B, of a first inventive sheet membrane 23A, is placed over a first adhesive portion 34, of the third adhesive layer 32, and the two surfaces are securely mated or joined each to the other creating a bond along a length or area or overlap 61. In the next step, the second surface 10B, of a second inventive sheet membrane 23B, is placed over a second adhesive portion 36, of the exposed portion of the third adhesive layer 32, and the two surfaces are securely mated or joined each to the other, similarly, creating a bond along a length or area or overlap 61. The sixth embodiment is very useful when installing the "alternative non-factory lap". It should be appreciated that the edges of the inventive sheet membrane 23, may not be perfectly straight or aligned, and thus one could have a seam or gap 31, between the edges of the first inventive sheet membrane 23A, and the second inventive sheet membrane 23B. For some applications one could also use a pressure source 81, as shown in FIG. 8, such as, for example, using a steel or rubber roller 81, which is rolled or passed over the lap or the joint area or seam 66, along the seam or gap 31, several time while applying significant pressure to completely and securely bond or mate the detail strip 35, to the first inventive sheet membrane 23A, and to the second inventive sheet membrane 23B. A similar pressure source 81, can also be used whenever a first inventive sheet or membrane 23A, is being mated or secured to a second inventive sheet or membrane 23B, such as, along an edge 10D, or selvedge 10D, 12C.

Figure 7:
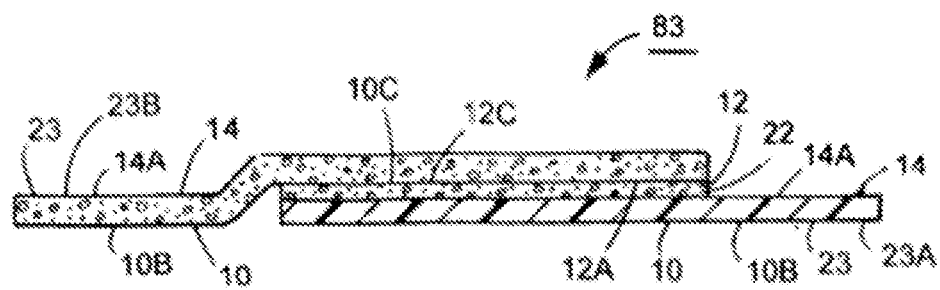
FIG. 7, illustrates a seventh embodiment of the inventive below grade, blind side, waterproofing sheet membrane with adhesive and reflectivity granular particle layer to fully bond to concrete/shotcrete.

FIG. 7, illustrates a seventh embodiment of the inventive below grade, blind side, waterproofing sheet membrane with adhesive and reflectivity granular particle layer to fully bond to concrete/shotcrete 83, where one portion, such as, an edge of a first inventive sheet membrane 23, is secured to another portion, such as, an edge of a second inventive sheet membrane 23. As shown in FIG. 7, the two individual inventive sheet membranes 23, comprises of at least one first inventive sheet membrane 23A, and at least one second inventive sheet membrane 23B, that are joined or mated together along an edge so as to create a "continuous" inventive sheet membrane 23. As shown in FIG. 7, the layer portion 12C, of the first surface 12A, of the first adhesive layer 12, of the first inventive sheet membrane 23A, is exposed for securing to the second inventive sheet membrane 23B, or the second adhesive layer 22, along the surface 10B, or layer portion 10C, of the second inventive sheet membrane 23B, is exposed for securing to the second inventive sheet membrane 23B. Thus, one would take the exposed surface of the first adhesive layer 12, or the second adhesive layer 22, of the first inventive sheet membrane 23A, and secure it to a portion of the second inventive sheet membrane 23B, that does not have an exposed first adhesive layer 12, or second adhesive layer 22, such as, along an edge 10C, 12C, or selvedge 10C, 12C.

FIG. 8, illustrates a eight embodiment of the inventive below grade, blind side, waterproofing sheet membrane with adhesive and reflectivity granular particle layer to fully bond to concrete/shotcrete 93, where one portion, such as, an edge of a first inventive sheet membrane 23, is secured to another portion, such as, an edge of a second inventive sheet membrane 23. As shown in FIG. 8, the two individual inventive sheet membranes 23, comprises of at least one first inventive sheet membrane 23A, and at least one second inventive sheet membrane 23B, that are joined or mated together along an edge so as to create a "continuous" inventive sheet membrane 23. As shown in FIG. 8, the layer portion 12C, of the first surface 12A, of the first adhesive layer 12, of a first inventive sheet membrane 23A has the first adhesive surface 12A, exposed, such as, by the removal of the release sheet 16, and that the second inventive sheet membrane 23B, having the second adhesive layer 22, is also exposed, such as, by the removal of the release sheet 28, and thus the exposed surface of the first adhesive layer 12, is mated with and secured to the exposed surface of the second adhesive layer 22, which results in the joining of the first inventive sheet membrane 23A, to the second inventive sheet membrane 23B, such as, along an edge 10C, 12C, or selvedge 10C, 12C. Optionally, one could also use at least one pressure source 81, such as, for example, a steel or rubber roller 81, that could be applied over the seam or gap 31, or the overlap 51, 61, several times while applying significant pressure to completely, and securely bond the first inventive sheet membrane 23A, to the second inventive sheet membrane 23B. At least one pressure source 81, can also be used whenever a first inventive sheet or membrane 23A, is being mated or secured to a second inventive sheet or membrane 23B, such as, along an edge 10D, or selvedge 10D. For some applications, such as, for example, during cold or wet weather where a first at least one inventive sheet membrane 23A, for some reason is not adhering to a second at least one inventive sheet membrane 23B, one could optionally, and gently, use at least one securing force 81, such as, for example, a heat gun 81, or a welder 81, (such as, a Liester welder), which would help improve the adhesion between the two overlapping inventive sheet membranes 23A, and 23B, such as, for example, along the overlap 51, 61. Thus, it should be understood that the at least one securing force 81, could be selected from a group comprising a roller, steel roller, a rubber roller, a plastic roller, a heat gun, a welder, and combinations thereof, to name a few.

Figure 9:
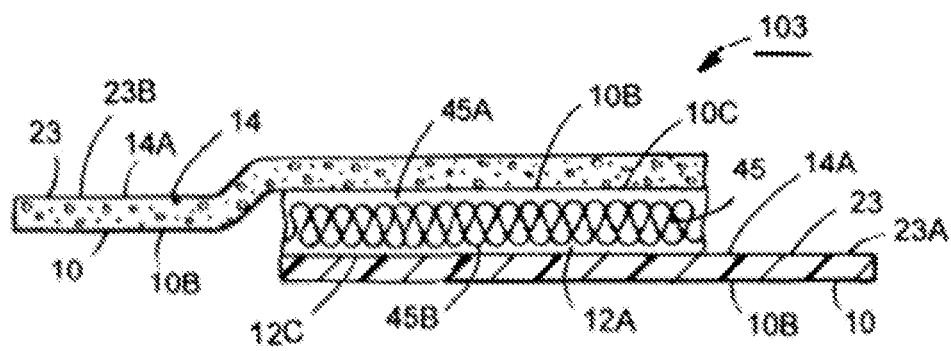
FIG. 9, illustrates a ninth embodiment of the inventive below grade, blind side, waterproofing sheet membrane with adhesive and reflectivity granular particle layer to fully bond to concrete/shotcrete.

FIG. 9, illustrates a ninth embodiment of the inventive below grade, blind side, waterproofing sheet membrane with adhesive and reflectivity granular particle layer to fully bond to concrete/shotcrete 103, where one portion, such as, an edge of a first inventive sheet membrane 23, is secured to another portion, such as, an edge of a second inventive sheet membrane 23. As shown in FIG. 9, the two individual inventive sheet membranes 23, comprises of at least one first inventive sheet membrane 23A, and at least one second inventive sheet membrane 23B, that are joined or mated together along an edge so as to create a "continuous" inventive sheet membrane 23. As shown in FIG. 9, the first surface 12A, or the first surface 14A, of the first inventive sheet membrane 23A, has secured thereto at least one double sided tape 45, such as, for example, an Aussie Skin Double Sided tape 45. The at least one double sided tape 45, has a first or upper or top surface 45A, and a second or lower or bottom surface 45B. The second surface 10B, of the second inventive sheet membrane 23B, is placed over at least an exposed portion of the double-sided tape 45, and the two inventive sheet membranes 23A, and 23B, are mated or joined each to the other, and which results in the joining of the first inventive sheet membrane 23A, to the second inventive sheet membrane 23B, such as, along an edge 10C, 12C, or selvedge 10C, 12C, and creating an overlap 51, 61.

Figure 10:
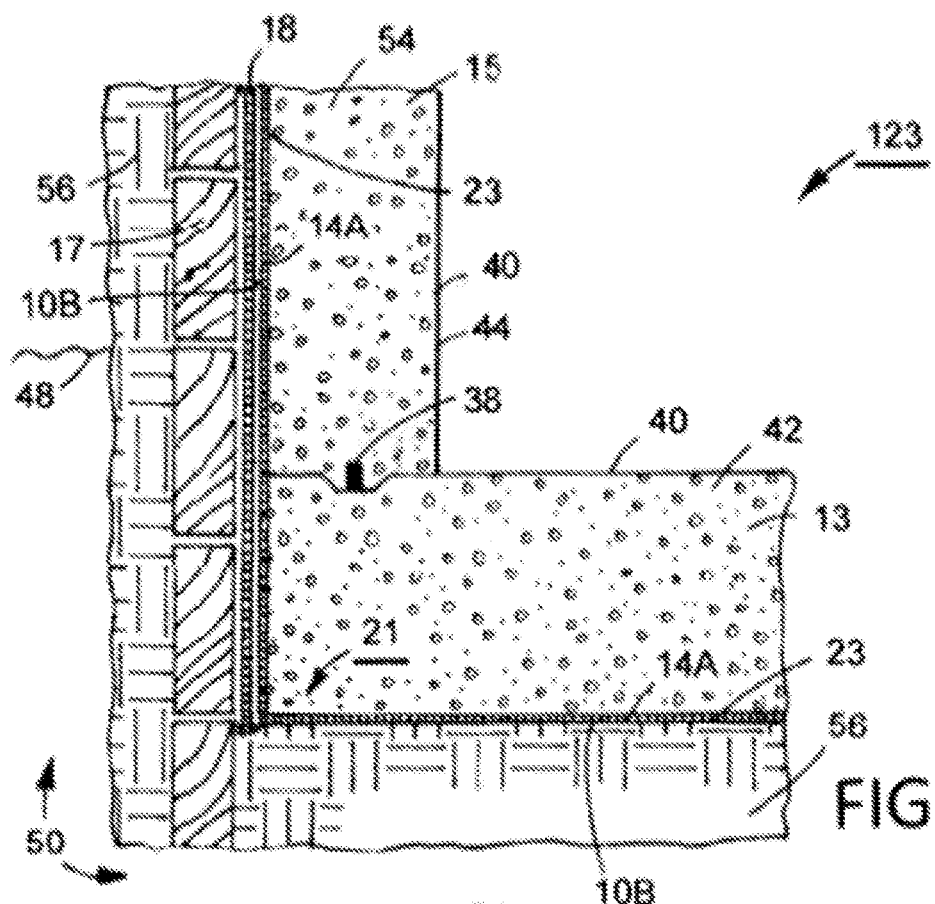
FIG. 10, illustrates a tenth embodiment of the inventive below grade, blind side, waterproofing sheet membrane with adhesive and reflectivity granular particle layer to fully bond to concrete/shotcrete.

FIG. 10, illustrates a tenth embodiment of the inventive below grade, blind side, waterproofing sheet membrane with adhesive and reflectivity granular particle layer to fully bond to concrete/shotcrete 123. After an area 50, has been dug up or prepared for the foundation of a building 54, or a floor 42, or a wall 44, or a structure 54, it is recommended that the area under the floor areas 42, be either compacted, to form a compacted earth 56, or that a mud slab 56, be installed, so as to create a substantially or appreciably flat horizontal or floor surface 42. It is also recommended that similar steps are also taken for the preparation of a side wall 44, or a blind wall 44, or a similar other structure 54, where the earth around the area 50, is compacted so as to create compacted or retained earth 56, or a mud slab 56, creating a substantially flat vertical or wall surface 44. For some applications it is recommended that at least one layer of a retaining means 17, or a soil retention system 17, such as, for example, wood lagging 17, be installed along the exposed surface or face of the compacted or retained earth 56, or the mud slab 56. For a blind side wall 44, a soil retention system 17, could also be installed, such as, for example, using wood lagging 17, soil cement 17, etc. It should be appreciated that a soil retention system 17, helps in holding back the compacted earth or dirt 56, from coming down due to, for example, gravity. The soil retention system 17, also helps in creating a substantially uniform vertical surface for the wall 44. Optionally, for some applications, if needed, one could also place at least one drain board 18, (such as, for example, AVM Drain Board 6000), or at least one foam layer 18, or at least one polystyrene insulation board 18, or any other protection media 18, as required, along the exposed surface or face of the wood lagging 17. The next step is to apply or secure at least one layer of the inventive membrane sheet 23, such as, for example, Aussie Skin 550G, Aussie Skin 560G, against the open face or surface of the wall 44, or drain board 18, or foam layer 18, (if used) or over or against the compacted earth 56, or mud slab 56, or waist slab 56, or the soil retention system 17. It should be understood that the second surface 10B, of the sheet membrane or layer 10, would face or be secured to the open face or surface of the wall 44, or drain board 18, or foam layer 18, (if used) or over or against the compacted earth 56, or mud slab 56, or waist slab 56, or the soil retention system 17, and the first surface 14A, of the at least one layer of at least one reflectivity granular particle layer 14, would be used to secure or apply the concrete/shotcrete 13, 15. The inventive sheet waterproofing membrane or layer 23, usually comes in sheets 23, or rolls 23, which are then hung onto the exposed wall surface 44, using at least one securing means, such as, nails, screws, bolt, anchor, adhesive material, and combinations thereof, to name a few. The inventive sheet waterproofing layer 23, that is installed along the surface of the wall 44, may terminate at the wall-to-floor corner 21, or be returned or extend several inches along the floor 42, such as, for example, say about 12 inches along the floor 42, and creating at least one sheet waterproofing layer extension, or for some applications it could extend along the whole floor surface or floor 42. The inventive membrane or layer 23, may not need to be secured to the floor 42, at all and simply be laid on the ground or floor 42, and then one would use gravity to hold the layer or sheet membrane 23, in place. The next step is to create a concrete barrier for the foundation of the structure 54, or wall 44, or building 54, such as, for example, a concrete or shotcrete slab 13, which would go onto the floor 42, and/or a concrete or shotcrete wall 15, which would be along the wall 44, or a ceiling (not shown). The concrete wall 15, or concrete floor 13, that is formed over the inventive sheet membrane 23, is such that the exposed side of the concrete wall 44, 15, or floor 42, 13, forms the interior wall 40, or the exterior wall 40, or interior floor 40, or exterior floor 40, of the structure 54, or building 54. The concrete slab 13, 15, or barrier 13, 15, for the foundation of the structure 54, or floor 42, or wall 54, or building 54, is preferably a concrete or shotcrete slab or floor 13, and/or a concrete or shotcrete wall 15. The inventive membrane waterproofing system 23, prevents the water 48, or moisture 48, or hydrostatic pressure 48, from penetrating into the concrete/shotcrete floor 13 or concrete/shotcrete wall 15, from around a water table 48, or moisture 48, or hydrostatic pressure 48, thus keeping the floor 42, or the wall 44, or ceiling (not shown) completely dry, even though the area 50, around the structure 54, has water 48, or moisture 48, or hydrostatic pressure 48. The inventive membrane waterproofing system 23, comprises essentially of at least one inventive sheet membrane 23, which allows for a waterproofing of the area or regions that needs waterproofing or moisture proofing. For some applications, one could also provide the floor 42, wall 44, joining location with at least one water-stop 38, such as, for example, an Aussie swell water-stop 38.

Figure 11:
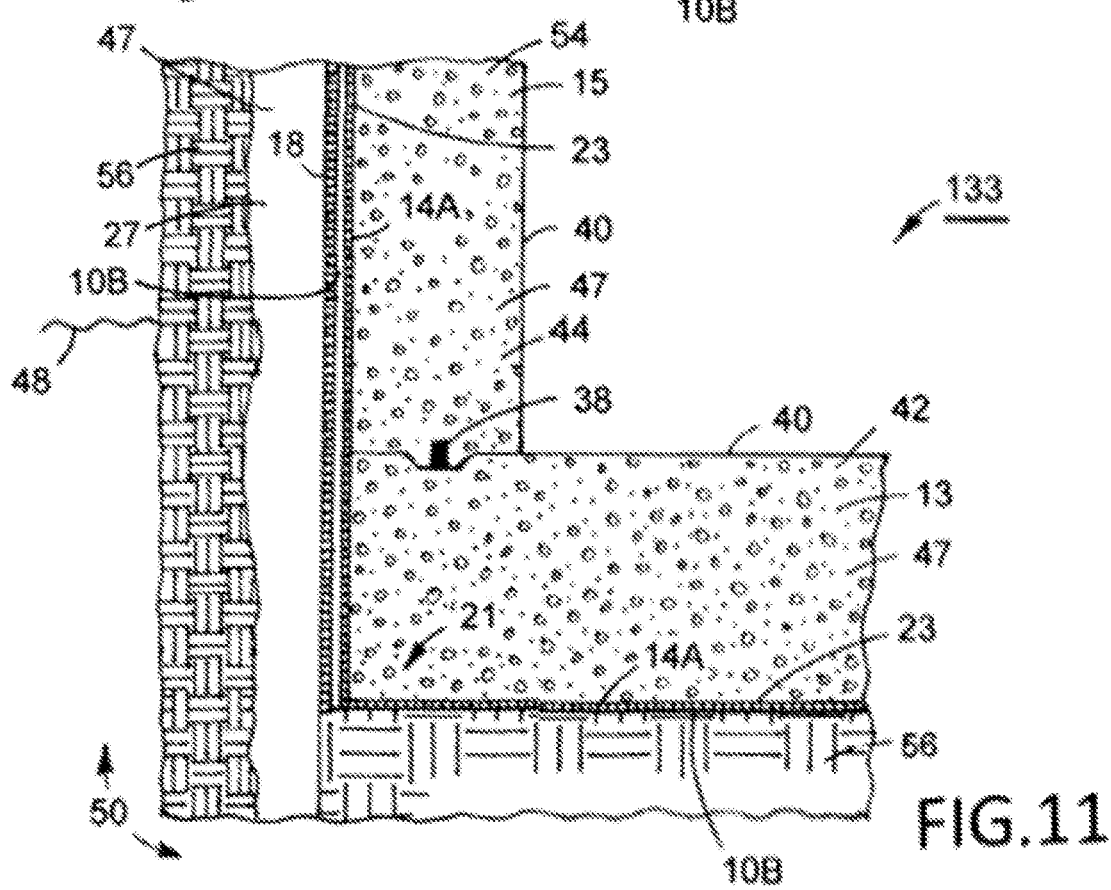
FIG. 11, illustrates a eleventh embodiment of the inventive below grade, blind side, waterproofing sheet membrane with adhesive and reflectivity granular particle layer to fully bond to concrete/shotcrete.

FIG. 11, illustrates a eleventh embodiment of the inventive below grade, blind side, waterproofing sheet membrane with adhesive and reflectivity granular particle layer to fully bond to concrete/shotcrete 133. The structure of FIG. 11, is similar to the structure of FIG. 10, except that a concrete or a shotcrete retaining wall 27, has been installed instead of a wood lagging 17, between the retained earth 56, and the optional insulation board 18, or the drain board 18, and the inventive sheet waterproofing membrane 23. For some applications the concrete or a shotcrete retaining wall 27, 44, could contain at least one metal wire mesh, which is embedded within the shotcrete/concrete 27, 15. The concrete or a shotcrete retaining wall 27, 44, can also be reinforced, using at least one reinforcing means 47, such as, for example, steel rods 47, steel mesh 47, rebar 47, fibers 47, wire mesh 47, and combinations thereof, to name a few. For some applications, the sprayed concrete 13, 15, or shotcrete 13, 15, is typically reinforced by conventional securing means 47, such as, for example, steel rods 47, steel mesh 47, fibers 47, and combinations thereof, or, for example, a rebar cage 47.

Figure 12:
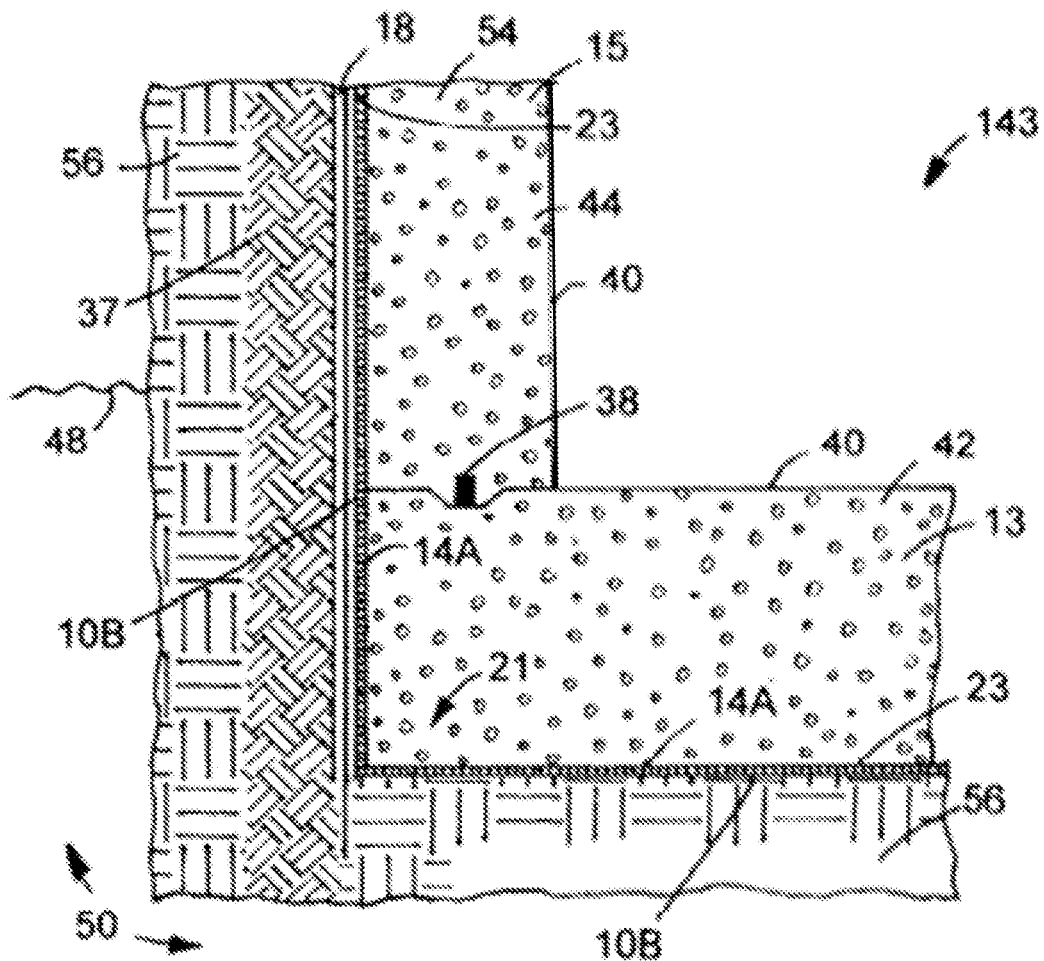
FIG. 12, illustrates a twelfth embodiment of the inventive below grade, blind side, waterproofing sheet membrane with adhesive and reflectivity granular particle layer to fully bond to concrete/shotcrete.

FIG. 12, illustrates a twelfth embodiment of the inventive below grade, blind side, waterproofing sheet membrane with adhesive and reflectivity granular particle layer to fully bond to concrete/shotcrete 143. The structure of FIG. 12, is similar to the structure of FIG. 10, except that another soil retention system 37, is being shown instead of a wood lagging 17, between the retained earth 56, and the optional insulation board 18, or the drain board 18, and the inventive sheet waterproofing membrane 23. The another soil retention system 37, could be any of the other typical soil retention systems 37, such as, for example, lagging retention systems, soil/cement retention systems, shot-crete retention systems, concrete retention systems, using shot-crete or concrete to create thin temporary walls retention systems, plywood retention systems, pylons retention systems, caissons retention systems, sheet-metal piles retention systems, diaphragm wall retention systems, and combinations thereof, to name a few. For some applications, such as, for example, a blind side wall 44, a soil retention system 37, may be needed to be installed, such as, for example, using wood lagging 37, a soil cement 37, a metal wire mesh embedded in concrete 37, to name a few. It should be appreciated that a soil retention system 37, helps in holding back the compacted earth or dirt 56, from coming down due to, for example, gravity. The soil retention system 37, also helps in creating a substantially uniform vertical wall surface 44.

Figure 13:
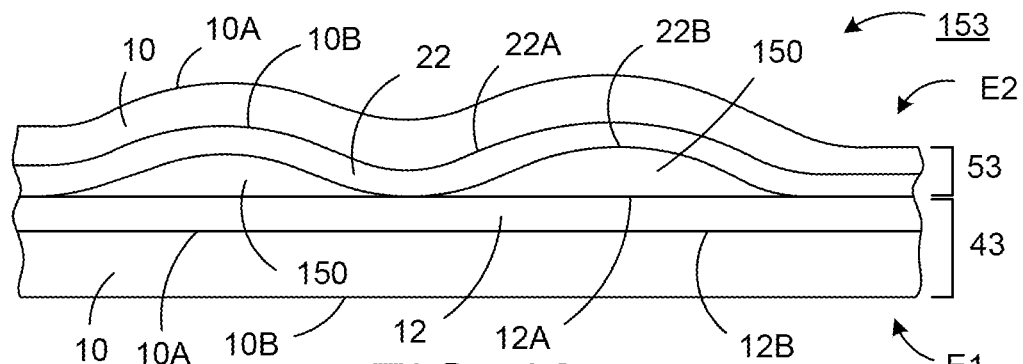
FIG. 13, illustrates a thirteenth embodiment of the inventive below grade, blind side, waterproofing sheet membrane with standard adhesive having reflective granular particle layer to fully bond to concrete/shotcrete.

FIG. 13, illustrates a thirteenth embodiment of the inventive below grade, blind side, waterproofing sheet membrane with standard adhesive having reflective granular particle layer to fully bond to concrete/shotcrete 153. As illustrated in FIG. 3, and FIG. 4, the edges of the first inventive below grade, blind side, waterproofing sheet membrane with standard or regular adhesive having reflective granular particle layer to fully bond to concrete/shotcrete 43, has a factory edge E1, having a first edge standard or regular adhesive layer 12, which has a first protective or release layer 16, which first protective or release layer 16, is removed when the first inventive sheet layer or membrane 43, is adhered to a second inventive sheet layer or membrane 53, having a second standard or regular adhesive layer 22, with a second protective or release layer 28, and where the second protective or release layer 28, is removed prior to adhering the exposed face 12A, of the first standard or regular adhesive 12, to the exposed face 22B, of the second adhesive layer 22, so as to join the first inventive sheet layer or membrane 43, to the second inventive sheet layer or membrane 53. However, It has been observed in the field that under certain conditions the first lap edge E1, of the first inventive sheet layer or membrane 43, does not fully adhere to the second lap edge E2, of the second inventive sheet layer or membrane 53, and that it separates at one or more locations creating an air pocket or undulation or separation 150, which weakens the adherence of the first edge E1, to the second edge E2, and this separation 150, also allows other material, or air, or other contaminates to enter into the air pocket or the separation area 150, thus further weakening the edge bonding of the first sheet or layer or membrane 43, to the second sheet or layer or membrane 53, and which eventually could lead to field failures.

Figure 14:
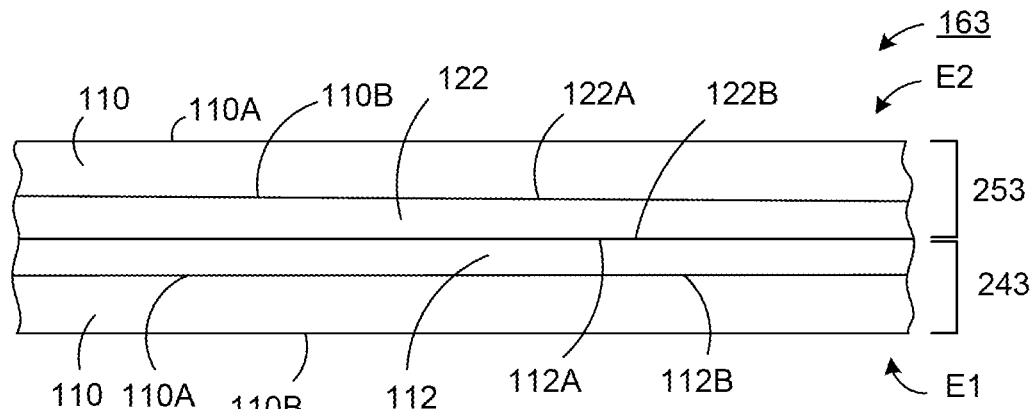
FIG. 14, illustrates a fourteenth embodiment of the inventive below grade, blind side, waterproofing sheet membrane with high strength adhesive having reflective granular particle layer to fully bond to concrete/shotcrete.

FIG. 14, illustrates a fourteenth embodiment of the inventive below grade, blind side, waterproofing sheet membrane with high strength adhesive having reflective granular particle layer to fully bond to concrete/shotcrete 163. The membrane or layer or sheet 163, is created by the joining or mating of the edge E1, E2, of a first inventive sheet layer or membrane 243, with a second inventive sheet layer or membrane 253. The first inventive sheet layer or membrane 243, has a sheet membrane or layer 110, having a first or top or upper surface 110A, and a second or lower or bottom surface 110B, and has secured thereto at least one layer of at least one first adhesive 112, such that the first adhesive layer 112, has a first or top or upper surface 112A, and a second or lower or bottom surface 112B, and wherein the first surface 110A, of the sheet membrane 110, is in secure contact with the second surface 112B, of the first adhesive layer 112. Similarly, the second inventive sheet layer or membrane 253, has a sheet membrane or layer 110, having a first or top or upper surface 110A, and a second or lower or bottom surface 110B, and has secured thereto at least one layer of at least one second adhesive 122, such that the second adhesive layer 122, has a first or top or upper surface 122A, and a second or lower or bottom surface 122B, and wherein the second surface 110B, of the sheet membrane 110, is in secure contact with the first surface 122A, of the second adhesive layer 122. Thus, as one can appreciated that the first adhesive layer 112, is joined or mated or secured to the second adhesive layer 122. As illustrated in FIG. 3, and FIG. 4, the edges of the first inventive below grade, blind side, waterproofing sheet membrane with high strength adhesive having reflective granular particle layer to fully bond to concrete/shotcrete 223, has a factory edge E1, having a first inventive high strength or enhanced adhesive layer 112, which has a first protective or release layer 116, (shown in FIG. 15), which first protective or release layer 116, is removed when the first inventive sheet layer or membrane 243, is adhered to a second inventive sheet layer or membrane 253, having a second inventive high strength or enhanced adhesive layer 122, with a second protective or release layer 128, (shown in FIG. 16), and where the second protective or release layer 128, is removed prior to adhering the exposed face 112A, of the first inventive high strength adhesive 12, 112, to the exposed face 122B, of the second adhesive layer 122, so as to join the first inventive sheet layer or membrane 243, to the second inventive sheet layer or membrane 253. It was discovered that the inventive high strength first adhesive layer 112, has a very strong bond to the second inventive high strength adhesive layer 122, and this reduces or prevents the creation of any air pockets or undulations or separations 150, as clearly shown in FIG. 14.

This strong adherence of the first edge E1, to the second edge E2, prevents or substantially reduces the separation 150, and also prevents any other material, or air, or other contaminates to enter into the joint area E1/E2 between the first sheet or membrane 243, or the second sheet or membrane 253. This use of the inventive high strength adhesive 112, and 122, of the present invention overcomes or greatly reduces any field failure problems, and provides a very strong new adhesive joint at edges E1, E2, that allows the adhering of the two sheets or membranes 243, 253, without creating or substantially reducing any air pockets or any undulations or separations 150, between the edges E1, E2, of the two sheets or membranes 243, 253. It should also be appreciated that the new inventive high strength adhesive 112, 122, does not increase the edge thickness of the sheets or membranes 243, 253, along the joint area E1, E2, when compared to the thicknesses of the joint E1, E2, using the standard or regular edge adhesive layers 12, 28, as used earlier.

Figure 15:
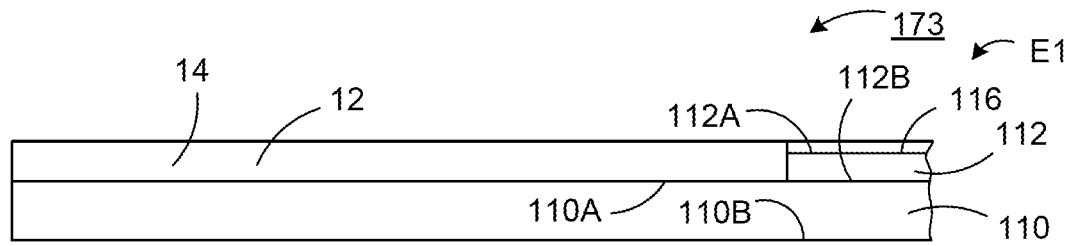
FIG. 15, illustrates a fifteenth embodiment of the inventive below grade, blind side, waterproofing sheet membrane with high strength adhesive having reflective granular particle layer to fully bond to concrete/shotcrete.

FIG. 15, illustrates a fifteenth embodiment of the inventive below grade, blind side, waterproofing sheet membrane with high strength adhesive having reflective granular particle layer to fully bond to concrete/shotcrete 173. The sheet membrane or layer 173, is similar to the embodiments illustrated in FIGS. 1-9, except that the edge E1, has a second top inventive high strength adhesive layer 112, along the substrate or sheet edge E1, while the rest of the membrane or layer 173, has the standard or regular adhesive layer 12, having the reflective granular particle layer 14, as illustrated in FIGS. 1-9. It should be appreciated that along the edge E1, the inventive high strength adhesive 112, does not have the reflective granular particle layer 14, and that the inventive high strength adhesive 112, is protected by at least one release or protective layer 116.

Figure 16:
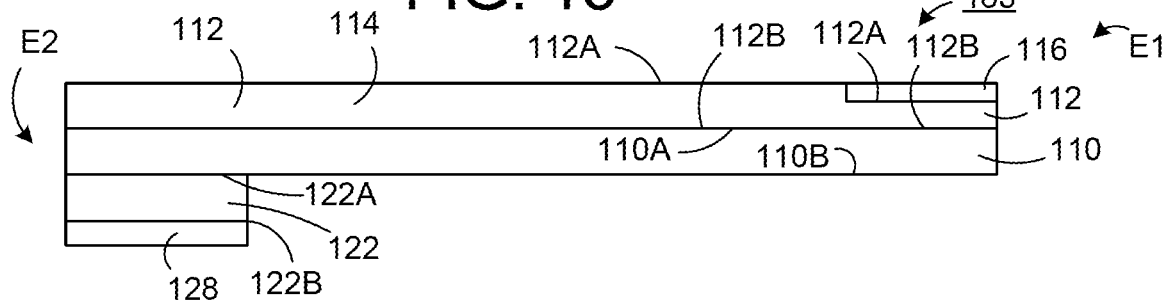
FIG. 16, illustrates a sixteenth embodiment of the inventive below grade, blind side, waterproofing sheet membrane with high strength adhesive having reflective granular particle layer to fully bond to concrete/shotcrete.

FIG. 16, illustrates a sixteenth embodiment of the inventive below grade, blind side, waterproofing sheet membrane with high strength adhesive having reflective granular particle layer to fully bond to concrete/shotcrete 183. The sheet membrane or layer 183, is similar to the embodiments illustrated in FIGS. 1-9, except that from the first edge E1, to the second edge E2, the substrate or sheet or layer 183, has a coating or layer of the inventive high strength adhesive layer 112, and also having the reflective granular particle layer 114, along at least a portion of the first or top surface of the substrate or sheet 183. Thus, as one can appreciated that the inventive high strength adhesive layer 112, is not only along the salvage edge E1, but it is also used to embed the reflective granular particle layer 114. And, then along the second substrate edge E2, the sheet or membrane layer 183, has the second inventive high strength adhesive layer 122, along with at least one release or protective layer 128. It should be appreciated that along the edge E1, the inventive high strength adhesive 112, does not have the reflective granular particle layer 114, and that the inventive high strength adhesive 112, is protected by at least one release or protective layer 116.

Figure 17:
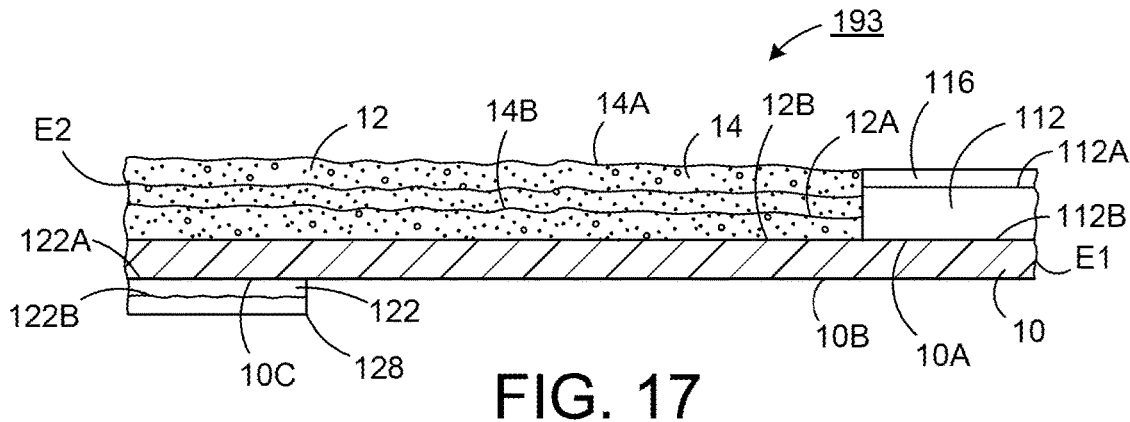
FIG. 17, illustrates a seventeenth embodiment of the inventive below grade, blind side, waterproofing sheet membrane with high strength adhesive having reflective granular particle layer to fully bond to concrete/shotcrete.

FIG. 17, illustrates a seventeenth embodiment of the inventive below grade, blind side, waterproofing sheet membrane with high strength adhesive having reflective granular particle layer to fully bond to concrete/shotcrete 193, which is similar to the third embodiment 43, (FIG. 3), and the fourth embodiment 53, (FIG. 4), wherein the layer portion 12C, of the first inventive high strength adhesive layer 112, does not have the at least one layer of at least one reflective granular particle layer 14, over the first surface 112A, and where the layer portion 12C, could be covered or protected with at least one first or top removable release layer or sheet 116, which release sheet or layer 116, is removed, as needed, during installation or application of the inventive waterproofing sheet membrane with adhesive and reflectivity granular particle layer 193. It should be appreciated that the inventive high strength adhesive layer portion 112, is along at least one first edge E1, such as, along a factory edge E1, or selvedge E1. Additionally, the membrane or sheet 10, has secured thereto, at least one layer of at least one second inventive high strength adhesive layer 122, along a portion of the second surface 10B, in the layer portion or area 10C. The second inventive high strength adhesive layer 122, has a first or top or upper surface 122A, and a second or lower or bottom surface 122B. The second surface 122B, of the second inventive high strength adhesive layer 122, is preferably covered or protected with at least one second or bottom removable release layer or sheet 128, while the surface 122A, of the at least one second inventive high strength adhesive layer 122, is in secure mating contact with the second surface 10B, in the layer portion or area 10C. The at least one second release sheet 128, is removed, as needed, during installation or application of the inventive waterproofing sheet membrane with high strength adhesive and reflective granular particle layer 193. It is preferred that the layer portion 10C, is along at least one edge of the membrane layer 10, and preferably along a factory edge 10C, E2, such as, a selvedge 10C, E2.

As one can clearly see in FIG. 17, that the inventive waterproofing layer 193, having a waterproofing sheet membrane, and a high strength adhesive layer having embedded therein and having reflective granular particles embedded therein 193, has dual removable release liners or sheets 116, 128, protecting a first inventive high strength adhesive layer 112, and a second inventive high strength adhesive layer 122, and where the first removable release layer or sheet 116, protects the first inventive high strength adhesive layer 112, which is on the first or top or upper portion 112A, of the inventive waterproofing layer 193, having a waterproofing sheet membrane, and a high strength adhesive layer having embedded therein and having reflective granular particles embedded therein 193, and a second removable release layer or sheet 128, protects the second inventive high strength adhesive layer 122, which is on the second or bottom or lower portion 10B, of the inventive waterproofing layer 193, having a waterproofing sheet membrane, and a high strength adhesive layer having embedded therein and having reflective granular particles embedded therein 193.

Figure 18:
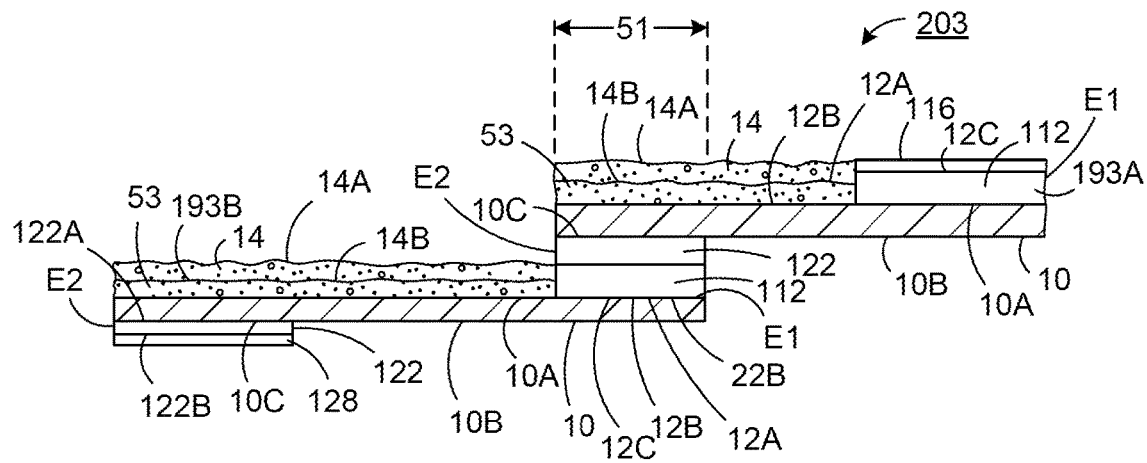
FIG. 18, illustrates an eighteenth embodiment of the inventive below grade, blind side, waterproofing sheet membrane with high strength adhesive and having reflective granular particle layer to fully bond to concrete/shotcrete.

FIG. 18, illustrates an eighteenth embodiment of the inventive below grade, blind side, waterproofing sheet membrane with high strength adhesive and having reflective granular particle layer to fully bond to concrete/shotcrete 203, which is similar to the seventeenth embodiment 193. As shown in FIG. 18, the two inventive sheets 193, comprises of a first inventive membrane sheet 193A, and a second inventive membrane sheet 193B, which are joined or mated together, so as to create a "continuous" inventive membrane sheet 193. As shown in FIG. 18, one edge E2, of the first inventive membrane sheet 193A, is secured to another edge E1, of a second inventive membrane sheet 193B. As shown in FIG. 18, the top release sheet 116, of the second inventive sheet 193B, is removed so as to expose at least a portion of the first inventive high strength adhesive layer 112, along the edge portion E1, and the bottom release sheet 128, of the first inventive membrane sheet 193A, is removed so as to expose at least a portion of the second surface 22B, of the second inventive high strength adhesive layer 122, along the edge portion E2, and wherein at least a portion of the first inventive high strength adhesive layer 112, of the second inventive sheet 193B, is secured to at least a portion of the second inventive high strength adhesive layer 122, of the first inventive membrane sheet 193A, and thus creating a very strong bond along a length or area or overlap 51, comprising edge portions E1, E2.

Figure 19:
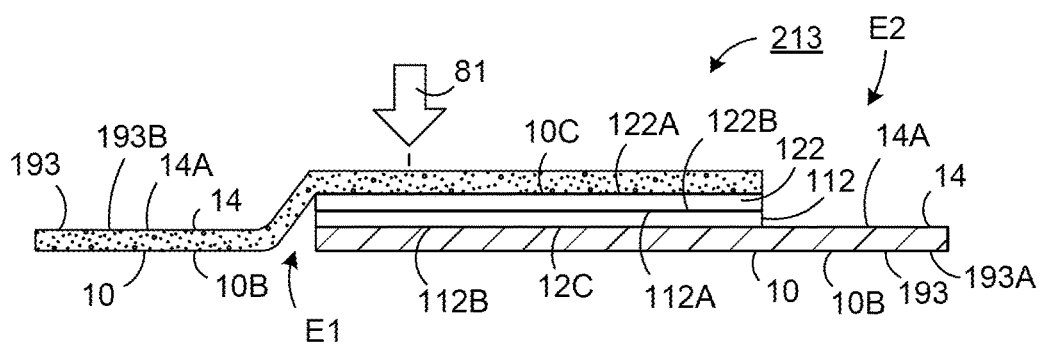
FIG. 19, illustrates a nineteenth embodiment of the inventive below grade, blind side, waterproofing sheet membrane with high strength adhesive and having reflective granular particle layer to fully bond to concrete/shotcrete.

FIG. 19, illustrates a nineteenth embodiment of the inventive below grade, blind side, waterproofing sheet membrane with high strength adhesive and having reflective granular particle layer to fully bond to concrete/shotcrete 213, where one portion, such as, an edge E1, of a first inventive sheet membrane 193, is secured to another portion, such as, an edge E2, of a second inventive sheet membrane 193. As shown in FIG. 19, the two individual inventive sheet membranes 193, comprises of at least one first inventive sheet membrane 193A, and at least one second inventive sheet membrane 193B, that are joined or mated together along an edge E1, E2, so as to create a "continuous" inventive sheet membrane 193. As shown in FIG. 19, the layer portion 12C, of the first surface 112A, of the first inventive high strength adhesive layer 112, of a first inventive sheet membrane 193A, has the first inventive high strength adhesive surface 112A, exposed, such as, by the removal of the release sheet 116, and that the second inventive sheet membrane 193B, having the second inventive high strength adhesive layer 122, is also exposed, such as, by the removal of the release sheet 128, and thus the exposed surface of the first inventive high strength adhesive layer 112, is mated with and secured to the exposed surface of the second inventive high strength adhesive layer 122, which results in the joining of the first inventive sheet membrane 193A, to the second inventive sheet membrane 193B, such as, along an edge E1, E2, 10C, 12C, or selvedge E1, E2, 10C, 12C. Optionally, one could also use at least one pressure source 81, such as, for example, a steel or rubber roller 81, that could be applied over the seam or gap 31, (FIG. 6) or the overlap 51, 61, (FIGS. 5, and 6), several times while applying significant pressure to completely, and securely bond the first inventive sheet membrane 193A, to the second inventive sheet membrane 193B. At least one pressure source 81, can also be used whenever a first inventive sheet or membrane 193A, is being mated or secured to a second inventive sheet or membrane 193B, such as, along an edge E1, E2, 10D, or selvedge E1, E2, 10D. For some applications, such as, for example, during cold or wet weather where a first at least one inventive sheet membrane 193A, for some reason is not adhering to a second at least one inventive sheet membrane 193B, one could optionally, and gently, use at least one securing force 81, such as, for example, a heat gun 81, or a welder 81, (such as, a Liester welder), which would help improve the adhesion between the two overlapping inventive sheet membranes 193A, and 193B, such as, for example, along the overlap 51, 61. Thus, it should be understood that the at least one securing force 81, could be selected from a group comprising a roller, steel roller, a rubber roller, a plastic roller, a heat gun, a welder, and combinations thereof, to name a few.

Figure 20:
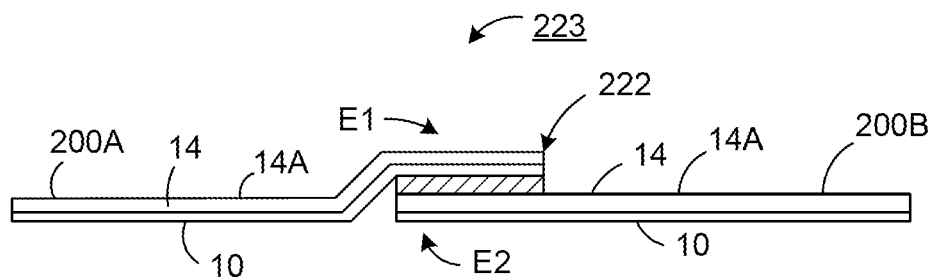
FIG. 20, illustrates a twentieth embodiment of the inventive below grade, blind side, waterproofing sheet membrane with high strength adhesive and having reflective granular particle layer to fully bond to concrete/shotcrete.
Figure 31:
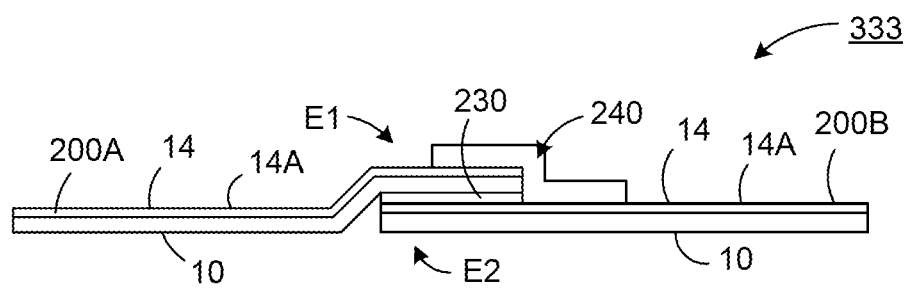
FIG. 31, illustrates a thirty-first embodiment of the inventive below grade, blind side, waterproofing sheet membrane with high strength adhesive and having reflective granular particle layer to fully bond to concrete/shotcrete.

FIG. 20, to FIG. 31, will now be discussed where a portion, such as, an edge E1, of a first inventive sheet membrane 200A, is secured to another portion, such as, an edge E2, of a second inventive sheet membrane 200B. For the ease of understanding all features of the first inventive sheet membrane 200A, and the second inventive sheet membrane 200B, are not being illustrated, but they are presumed to be present, and are incorporated herein by reference as illustrated in FIG. 1, through FIG. 19.

FIG. 20, illustrates a twentieth embodiment of the inventive below grade, blind side, waterproofing sheet membrane with high strength adhesive and having reflective granular particle layer to fully bond to concrete/shotcrete 223, illustrating the joining of a first inventive sheet membrane 200A, having a dual salvage edge, to a second inventive sheet membrane 200B, having a factory lap. A first inventive sheet membrane 200A, having a dual salvage edge, has been illustrated in FIGS. 4, 16, and 17, where the first inventive sheet membrane 200A, has a first edge adhesive layer 12, 112, at one first end or salvage edge, and a second edge adhesive layer 22, 122, 222, at a second end or salvage edge. The second inventive sheet membrane 200B, having a factory lap, essentially means that that end or edge does not have any adhesive layer 12, 112, 22, 122, 222, but has at least one layer of inventive granular particle layer 14, embedded in an adhesive layer 12, 112. Thus, the adhesive layer 22, 122, and 222, is directly adhered or joined to the at least one layer of at least one reflective granular particle layer 14. The first inventive sheet membrane 200A, having the second edge adhesive layer 222, at the second end or salvage edge, is secured to the factory lap or edge of the second inventive sheet membrane 200B. As one can see in FIG. 20, that the two individual inventive sheet membranes 200A, 200B, have been joined or mated together along the edge E1, E2, so as to create one "continuous" inventive sheet membrane 223.

Figure 21:
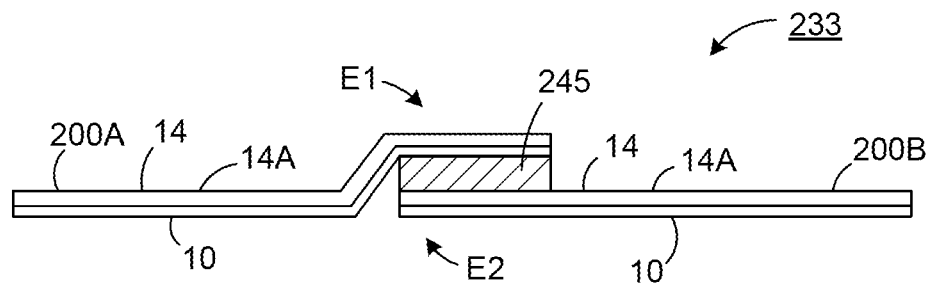
FIG. 21, illustrates a twenty-first embodiment of the inventive below grade, blind side, waterproofing sheet membrane with high strength adhesive and having reflective granular particle layer to fully bond to concrete/shotcrete.

FIG. 21, illustrates a twenty-first embodiment of the inventive below grade, blind side, waterproofing sheet membrane with high strength adhesive and having reflective granular particle layer to fully bond to concrete/shotcrete 233, illustrating the joining of a first inventive sheet membrane 200A, having a non-factory lap, to a second inventive sheet membrane 200B, having a non-factory lap. A non-factory lap, essentially means that that end or edge of the sheet or membrane 200A, 200B, does not have any adhesive layer 12, 112, 22, 122, 222, but has at least one layer of inventive granular particle layer 14, embedded in an adhesive layer 12, 112. A non-factory lap is created when the inventive sheet membrane 200A, 200B, is started, or when the inventive sheet membrane 200A, 200B, is stopped or terminated, or when the inventive sheet membrane 200A, 200B, is cut during transportation or installation. A first inventive sheet membrane 200A, having a non-factory lap, and a second inventive sheet membrane 200B, having a non-factory lap, is similar to the first inventive sheet membrane 23A, and the second inventive sheet membrane 23B, illustrated in FIG. 9. The first inventive sheet membrane 200A, having the non-factory lap, is secured to the second inventive sheet membrane 200B, having the non-factory lap, along the edge E1, E2, using at least one double sided adhesive tape 45, 245. As one can see in FIG. 21, that the two individual inventive sheet membranes 200A, 200B, have been joined or mated together along the edge E1, E2, so as to create one "continuous" inventive sheet membrane 233.

Figure 22:
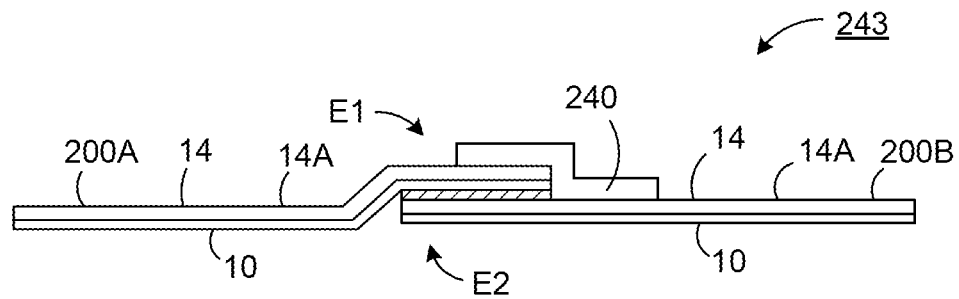
FIG. 22, illustrates a twenty-second embodiment of the inventive below grade, blind side, waterproofing sheet membrane with high strength adhesive and having reflective granular particle layer to fully bond to concrete/shotcrete.

FIG. 22, illustrates a twenty-second embodiment of the inventive below grade, blind side, waterproofing sheet membrane with high strength adhesive and having reflective granular particle layer to frilly bond to concrete/shotcrete 243, illustrating the joining of a first inventive sheet membrane 200A, having a dual salvage edge, to a second inventive sheet membrane 200B, having a factory lap. A first inventive sheet membrane 200A, having a dual salvage edge, has been illustrated in FIGS. 4, 16, and 17, where the first inventive sheet membrane 200A, has a first edge adhesive layer 12, 112, at one first end or salvage edge, and a second edge adhesive layer 22, 122, 222, at a second end or salvage edge. The second inventive sheet membrane 200B, having a factory lap, essentially means that that end, or edge does not have any adhesive layer 12, 112, 22, 122, 222, but has at least one layer of inventive granular particle layer 14, embedded in an adhesive layer 12, 112. The first inventive sheet membrane 200A, having the second edge adhesive layer 222, at the second end or salvage edge, is secured to the factory lap or edge of the second inventive sheet membrane 200B, and then at least one sanded tape 240, is then securely adhered to an edge of the first inventive sheet membrane 200A, and an edge of the second inventive sheet membrane 200B, along the edge E1, E2. Thus, as one can see in FIG. 22, that the two individual inventive sheet membranes 200A, 200B, have been joined or mated together along the edge E1, E2, so as to create one "continuous" inventive sheet membrane 243, having a sanded tape 240, providing additional adhering security.

Figure 23:
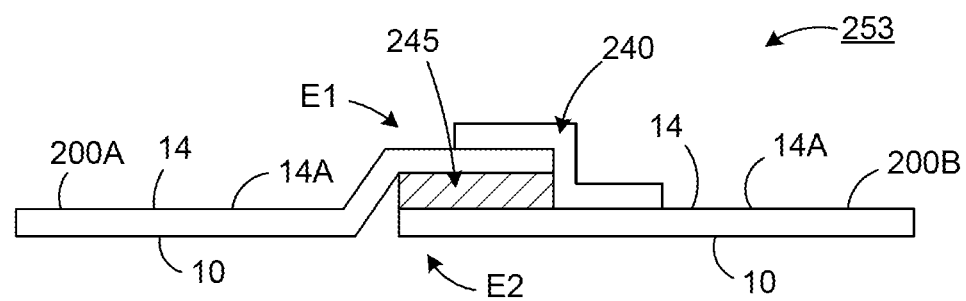
FIG. 23, illustrates a twenty-third embodiment of the inventive below grade, blind side, waterproofing sheet membrane with high strength adhesive and having reflective granular particle layer to fully bond to concrete/shotcrete.

FIG. 23, illustrates a twenty-third embodiment of the inventive below grade, blind side, waterproofing sheet membrane with high strength adhesive and having reflective granular particle layer to fully bond to concrete/shotcrete 253, illustrating the joining of a first inventive sheet membrane 200A, having a non-factory lap, to a second inventive sheet membrane 200B, having a non-factory lap. The first inventive sheet membrane 200A, having a non-factory lap, and the second inventive sheet membrane 200B, having a non-factory lap, is similar to the first inventive sheet membrane 23A, and the second inventive sheet membrane 23B, illustrated in FIG. 9. The first inventive sheet membrane 200A, having the non-factory lap, is secured to the second inventive sheet membrane 200B, having the non-factory lap, along the edge E1, E2, using at least one double sided adhesive tape 45, 245. At least one sanded tape 240, is then securely applied along the edge E1, E2, to secure the first inventive sheet membrane 200A, having a non-factory lap, to the second inventive sheet membrane 200B, having a non-factory lap. As one can see in FIG. 23, that the two individual inventive sheet membranes 200A, 200B, have been joined or mated together along the edge E1, E2, so as to create one "continuous" inventive sheet membrane 253, using at least one double sided adhesive tape 45, 245, and further secured using at least one sanded tape 240, to provide additional sheet adherence security.

Figure 24:
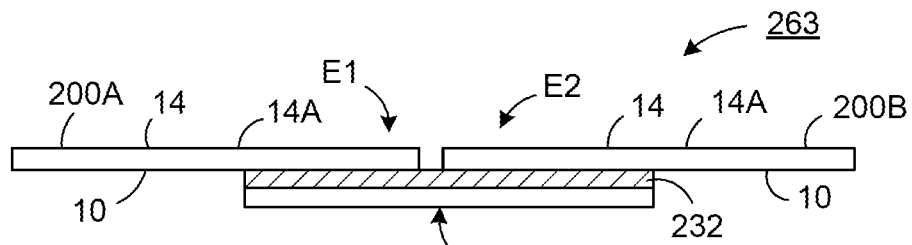
FIG. 24, illustrates a twenty-fourth embodiment of the inventive below grade, blind side, waterproofing sheet membrane with high strength adhesive and having reflective granular particle layer to fully bond to concrete/shotcrete.

FIG. 24, illustrates a twenty-fourth embodiment of the inventive below grade, blind side, waterproofing sheet membrane with high strength adhesive and having reflective granular particle layer to fully bond to concrete/shotcrete 263, illustrating the joining of a first inventive sheet membrane 200A, having a non-factory lap, to a second inventive sheet membrane 200B, having a non-factory lap. The first inventive sheet membrane 200A, having a non-factory lap, and the second inventive sheet membrane 200B, having a non-factory lap, is similar to the first inventive sheet membrane 23A, and the second inventive sheet membrane 23B, illustrated in FIG. 6. The first inventive sheet membrane 200A, having the non-factory lap, is secured to the second inventive sheet membrane 200B, having the non-factory lap, along the edge E1, E2, using at least one detailed strip 35, 235, having at least one layer of a third adhesive 32, 232. It should be appreciated that the third adhesive 32, 232, on the at least one detailed strip 35, 235, is secured to the bottom surface 10, of the two individual inventive sheet membranes 200A, 200B, along the edge E1, E2, so as to mate or join the two individual inventive sheet membranes 200A, 200B. As one can see in FIG. 24, that the two individual inventive sheet membranes 200A, 200B, have been joined or mated together along the edge E1, E2, so as to create one "continuous" inventive sheet membrane 263, using at least one detailed strip 35, 235, having at least one layer of a third adhesive 32, 232.

Figure 25:
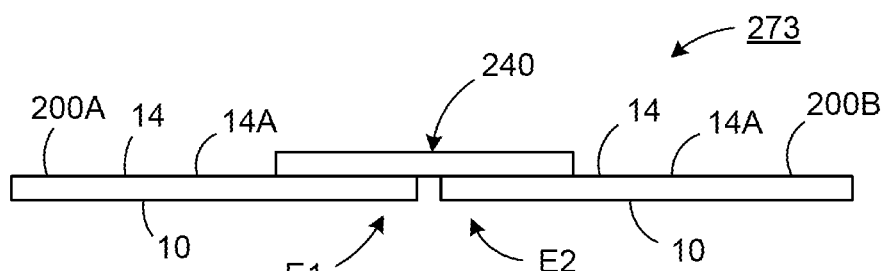
FIG. 25, illustrates a twenty-fifth embodiment of the inventive below grade, blind side, waterproofing sheet membrane with high strength adhesive and having reflective granular particle layer to fully bond to concrete/shotcrete.

FIG. 25, illustrates a twenty-fifth embodiment of the inventive below grade, blind side, waterproofing sheet membrane with high strength adhesive and having reflective granular particle layer to fully bond to concrete/shotcrete 273, illustrating the joining of a first inventive sheet membrane 200A, having a non-factory lap, to a second inventive sheet membrane 200B, having a non-factory lap. The first inventive sheet membrane 200A, having the non-factory lap, is secured to the second inventive sheet membrane 200B, having the non-factory lap, along the edge E1, E2, using at least one sanded adhesive tape 240. It should be appreciated that the at least one sanded adhesive tape 240, is secured to the top or upper surface 14A, of the two individual inventive sheet membranes 200A, 200B, along the edge E1, E2, so as to mate or join the two individual inventive sheet membranes 200A, 200B. As one can see in FIG. 25, that the two individual inventive sheet membranes 200A, 200B, have been joined or mated together along the edge E1, E2, so as to create one "continuous" inventive sheet membrane 273, using at least one sanded adhesive tape 240.

Figure 26:
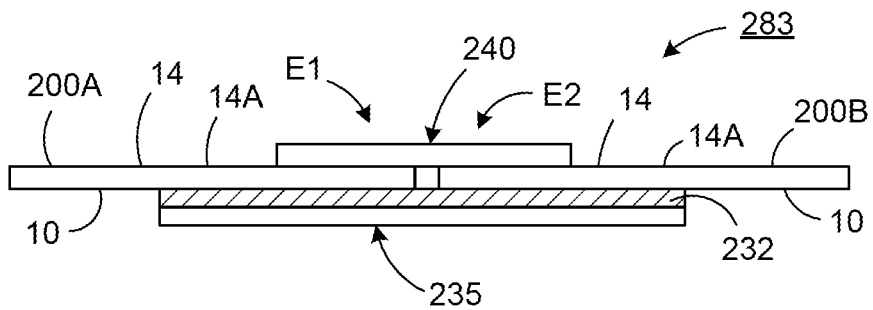
FIG. 26, illustrates a twenty-sixth embodiment of the inventive below grade, blind side, waterproofing sheet membrane with high strength adhesive and having reflective granular particle layer to fully bond to concrete/shotcrete.

FIG. 26, illustrates a twenty-sixth embodiment of the inventive below grade, blind side, waterproofing sheet membrane with high strength adhesive and having reflective granular particle layer to fully bond to concrete/shotcrete 283, illustrating the joining of a first inventive sheet membrane 200A, having a non-factory lap, to a second inventive sheet membrane 200B, having a non-factory lap. The first inventive sheet membrane 200A, having a non-factory lap, and the second inventive sheet membrane 200B, having a non-factory lap, is similar to the first inventive sheet membrane 23A, and the second inventive sheet membrane 23B, illustrated in FIG. 6. The first inventive sheet membrane 200A, having the non-factory lap, is secured to the second inventive sheet membrane 200B, having the non-factory lap, along the edge E1, E2, using at least one detailed strip 35, 235, having at least one layer of a third adhesive 32, 232. It should be appreciated that the third adhesive 32, 232, on the at least one detailed strip 35, 235, is secured to the bottom surface 10, of the two individual inventive sheet membranes 200A, 200B, along the edge E, E2, so as to mate or join the two individual inventive sheet membranes 200A, 200B. At least one sanded adhesive tape 240, is then secured to the top or upper surface 14A, of the two individual inventive sheet membranes 200A, 200B, along the edge E1, E2, so as to mate or join the two individual inventive sheet membranes 200A, 200B, and provide a second means or a reinforcing means to mate or join the two individual inventive sheet membranes 200A, 200B, along the edge E1, E2. It should be understood that either the at least one sanded adhesive tape 240, or the at least one detailed strip 35, 235, having at least one layer of a third adhesive 32, 232, could be applied first as the first joining means, and the other as the second joining means or the reinforcing means. As one can see in FIG. 26, that the two individual inventive sheet membranes 200A, 200B, have been joined or mated together along the edge E1, E2, so as to create one "continuous" inventive sheet membrane 283, using at least one detailed strip 35, 235, having at least one layer of a third adhesive 32, 232, and having a second mating or adherence means, namely, the at least one sanded adhesive tape 240.

Figure 27:
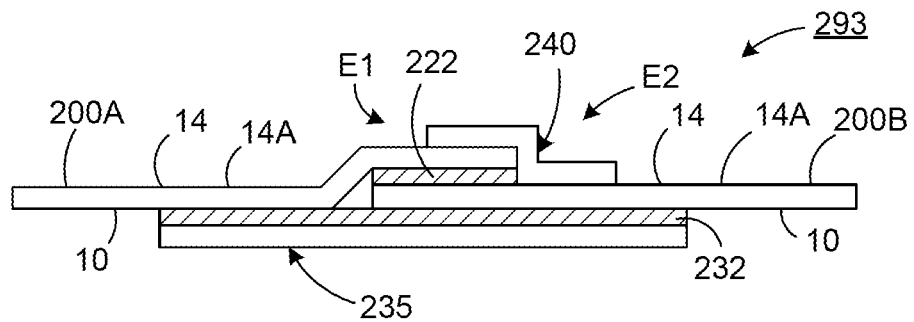
FIG. 27, illustrates a twenty-seventh embodiment of the inventive below grade, blind side, waterproofing sheet membrane with high strength adhesive and having reflective granular particle layer to frilly bond to concrete/shotcrete.

FIG. 27, illustrates a twenty-seventh embodiment of the inventive below grade, blind side, waterproofing sheet membrane with high strength adhesive and having reflective granular particle layer to fully bond to concrete/shotcrete 293, illustrating the joining of a first inventive sheet membrane 200A, having a dual salvage edge, to a second inventive sheet membrane 200B, having a factory lap. A first inventive sheet membrane 200A, having a dual salvage edge, has been illustrated in FIGS. 4, 16, and 17, where the first inventive sheet membrane 200A, has a first edge adhesive layer 12, 112, at one first end or salvage edge, and a second edge adhesive layer 22, 122, 222, at a second end or salvage edge. The second inventive sheet membrane 200B, having a factory lap, essentially means that that end or edge does not have any adhesive layer 12, 112, 22, 122, but has at least one layer of inventive granular particle layer 14, embedded in an adhesive layer 12, 112. The first inventive sheet membrane 200A, having the second edge adhesive layer 222, at the second end or salvage edge, is secured to the factory lap or edge of the second inventive sheet membrane 200B. It should be appreciated that the third adhesive 32, 232, on the at least one detailed strip 35, 235, is secured to the bottom surface 10, of the two individual inventive sheet membranes 200A, 200B, along the edge E1, E2, so as to mate or join the two individual inventive sheet membranes 200A, 200B. At least one sanded adhesive tape 240, is then secured to the top or upper surface 14A, of the two individual inventive sheet membranes 200A, 200B, along the edge E1, E2, so as to mate or join the two individual inventive sheet membranes 200A, 200B, and provide a second means or a reinforcing means to mate or join the two individual inventive sheet membranes 200A, 200B, along the edge E1, E2. It should be understood that either the at least one sanded adhesive tape 240, or the at least one detailed strip 35, 235, having at least one layer of a third adhesive 32, 232, could be applied first as the first joining means, and the other as the second joining means or the reinforcing means. As one can see in FIG. 27 that the two individual inventive sheet membranes 200A, 200B, have been joined or mated together along the edge E1, E2, so as to create one "continuous" inventive sheet membrane 293, using at least one detailed strip 35, 235, having at least one layer of a third adhesive 32, 232, and having a second mating or adherence means, namely, the at least one sanded adhesive tape 240.

Figure 28:
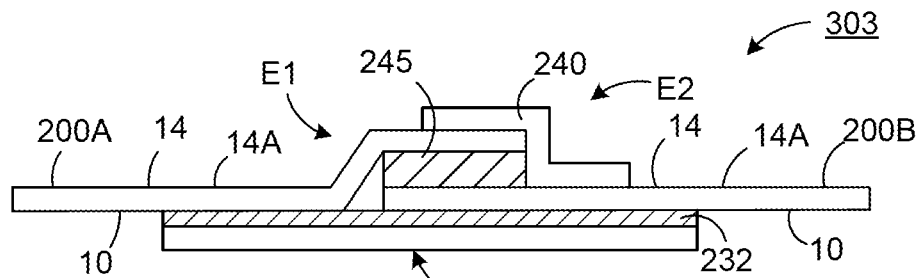
FIG. 28, illustrates a twenty-eighth embodiment of the inventive below grade, blind side, waterproofing sheet membrane with high strength adhesive and having reflective granular particle layer to fully bond to concrete/shotcrete.

FIG. 28, illustrates a twenty-eighth embodiment of the inventive below grade, blind side, waterproofing sheet membrane with high strength adhesive and having reflective granular particle layer to fully bond to concrete/shotcrete 303, illustrating the joining of a first inventive sheet membrane 200A, having a non-factory lap, to a second inventive sheet membrane 200B, having a non-factory lap. A non-factory lap, essentially means that that end or edge does not have any adhesive layer 12, 112, 22, 122, 222, but has at least one layer of inventive granular particle layer 14, embedded in an adhesive layer 12, 112. A non-factory lap is created when the inventive sheet membrane 200A, 200B, is started, or when the inventive sheet membrane 200A, 200B, is stopped or terminated, or when the inventive sheet membrane 200A, 200B, is cut during transportation or installation. A first inventive sheet membrane 200A, having a non-factory lap, and a second inventive sheet membrane 200B, having a non-factory lap, is similar to the first inventive sheet membrane 23A, and the second inventive sheet membrane 23B, illustrated in FIG. 9. The first inventive sheet membrane 200A, having the non-factory lap, is secured to the second inventive sheet membrane 200B, having the non-factory lap, along the edge E1, E2, using at least one double sided adhesive tape 45, 245. It should be appreciated that the third adhesive 32, 232, on the at least one detailed strip 35, 235, is secured to the bottom surface 10, of the two individual inventive sheet membranes 200A, 200B, along the edge E1, E2, so as to mate or join the two individual inventive sheet membranes 200A, 200B. At least one sanded adhesive tape 240, is then secured to the top or upper surface 14A, of the two individual inventive sheet membranes 200A, 200B, along the edge E1, E2, so as to mate or join the two individual inventive sheet membranes 200A, 200B, and provide a second means or a reinforcing means to mate or join the two individual inventive sheet membranes 200A, 200B, along the edge E1, E2. It should be understood that either the at least one sanded adhesive tape 240, or the at least one detailed strip 35, 235, having at least one layer of a third adhesive 32, 232, could be applied first as the first joining means, and the other as the second joining means or the reinforcing means. As one can see in FIG. 28, that the two individual inventive sheet membranes 200A, 200B, have been joined or mated together along the edge E1, E2, so as to create one "continuous" inventive sheet membrane 303, using at least one detailed strip 35, 235, having at least one layer of a third adhesive 32, 232, and having a second mating or adherence means, namely, the at least one sanded adhesive tape 240.

Figure 29:
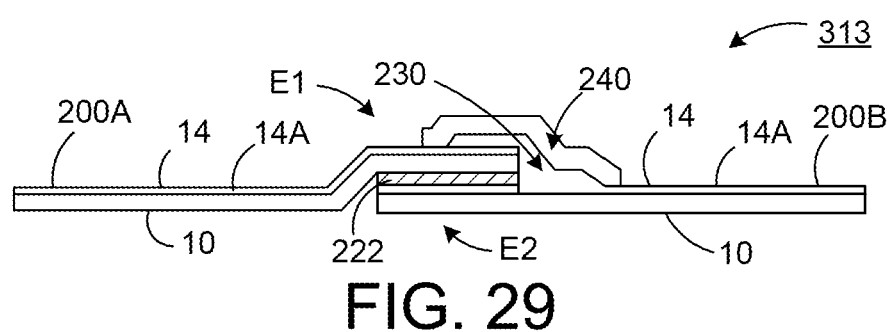
FIG. 29, illustrates a twenty-ninth embodiment of the inventive below grade, blind side, waterproofing sheet membrane with high strength adhesive and having reflective granular particle layer to fully bond to concrete/shotcrete.

FIG. 29, illustrates a twenty-ninth embodiment of the inventive below grade, blind side, waterproofing sheet membrane with high strength adhesive and having reflective granular particle layer to fully bond to concrete/shotcrete 313, illustrating the joining of a first inventive sheet membrane 200A, having a dual salvage edge, to a second inventive sheet membrane 200B, having a factory lap. A first inventive sheet membrane 200A, having a dual salvage edge, has been illustrated in FIGS. 4, 16, and 17, where the first inventive sheet membrane 200A, has a first edge adhesive layer 12, 112, at one first end or salvage edge, and a second edge adhesive layer 22, 122, 222, at a second end or salvage edge. The second inventive sheet membrane 200B, having a factory lap, essentially means that that end, or edge does not have any adhesive layer 12, 112, 22, 122, but has at least one layer of inventive granular particle layer 14, embedded in an adhesive layer 12, 112. The first inventive sheet membrane 200A, having the second edge adhesive layer 222, at the second end or salvage edge, is secured to the factory lap or edge of the second inventive sheet membrane 200B, and then at least one sealant 230, is applied along the joint between the first inventive sheet membrane 200A, having a dual salvage edge, and the second inventive sheet membrane 200B, having a factory lap. Before the sealant 230, has cured one would then apply at least one sanded adhesive tape 240, to further securely adhered the edge E1, of the first inventive sheet membrane 200A, to the edge E2, of the second inventive sheet membrane 200B, along the edge E1, E2. Thus, as one can see in FIG. 29, that the two individual inventive sheet membranes 200A, 200B, have been joined or mated together along the edge E1, E2, so as to create one "continuous" inventive sheet membrane 313, having at least one sealant 230, along with a protective sanded adhesive tape 240, providing additional adherence security.

Figure 30:
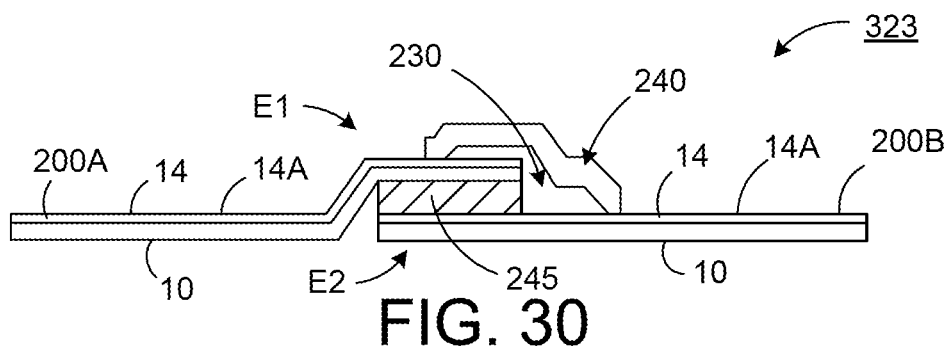
FIG. 30, illustrates a thirtieth embodiment of the inventive below grade, blind side, waterproofing sheet membrane with high strength adhesive and having reflective granular particle layer to fully bond to concrete/shotcrete.

FIG. 30, illustrates a thirtieth embodiment of the inventive below grade, blind side, waterproofing sheet membrane with high strength adhesive and having reflective granular particle layer to fully bond to concrete/shotcrete 323, illustrating the joining of a first inventive sheet membrane 200A, having a non-factory lap, to a second inventive sheet membrane 200B, having a non-factory lap. A non-factory lap, essentially means that that end or edge does not have any adhesive layer 12, 112, 22, 122, 222, but has at least one layer of inventive granular particle layer 14, embedded in an adhesive layer 12, 112. A non-factory lap is created when the inventive sheet membrane 200A, 200B, is started, or when the inventive sheet membrane 200A, 200B, is stopped or terminated, or when the inventive sheet membrane 200A, 200B, is cut during transportation or installation. A first inventive sheet membrane 200A, having a non-factory lap, and a second inventive sheet membrane 200B, having a non-factory lap, is similar to the first inventive sheet membrane 23A, and the second inventive sheet membrane 23B, illustrated in FIG. 9. The first inventive sheet membrane 200A, having the non-factory lap, is secured to the second inventive sheet membrane 200B, having the non-factory lap, along the edge E1, E2, using at least one double sided adhesive tape 45, 245, and then at least one sealant 230, is applied along the joint between the first inventive sheet membrane 200A, having the non-factory lap, and the second inventive sheet membrane 200B, having a non-factory lap. Before the sealant 230, has cured one would then apply at least one sanded adhesive tape 240, to further securely adhered the edge E1, of the first inventive sheet membrane 200A, to the edge E2, of the second inventive sheet membrane 200B, along the edge E1, E2. Thus, as one can see in FIG. 30, that the two individual inventive sheet membranes 200A, 200B, have been joined or mated together along the edge E1, E2, so as to create one "continuous" inventive sheet membrane 323, having at least one sealant 230, along with a protective sanded adhesive tape 240, providing additional adherence security.

FIG. 31, illustrates a thirty-first embodiment of the inventive below grade, blind side, waterproofing sheet membrane with high strength adhesive and having reflective granular particle layer to fully bond to concrete/shotcrete 333, illustrating the joining of a first inventive sheet membrane 200A, having a non-factory lap, to a second inventive sheet membrane 200B, having a non-factory lap. A non-factory lap, essentially means that that end or edge does not have any adhesive layer 12, 112, 22, 122, 222, but has at least one layer of inventive granular particle layer 14, embedded in an adhesive layer 12, 112. A non-factory lap is created when the inventive sheet membrane 200A, 200B, is started, or when the inventive sheet membrane 200A, 200B, is stopped or terminated, or when the inventive sheet membrane 200A, 200B, is cut during transportation or installation. A first inventive sheet membrane 200A, having a non-factory lap, and a second inventive sheet membrane 200B, having a non-factory lap, is similar to the first inventive sheet membrane 23A, and the second inventive sheet membrane 23B, illustrated in FIG. 9. The first inventive sheet membrane 200A, having the non-factory lap, is secured to the second inventive sheet membrane 200B, having the non-factory lap, along the edge E1, E2, using at least one sealant 230, such that a portion of the bottom surface edge of the first inventive sheet membrane 200A, having the non-factory lap, is secured to a portion of the top surface edge of the second inventive sheet membrane 200B, having the non-factory lap. After the sealant 230, has cured one would then apply at least one sanded adhesive tape 240, to further securely adhered the edge E1, of the first inventive sheet membrane 200A, to the edge E2, of the second inventive sheet membrane 200B, along the edge E1, E2. Thus, as one can see in FIG. 31, that the two individual inventive sheet membranes 200A, 200B, have been joined or mated together along the edge E1, E2, so as to create one "continuous" inventive sheet membrane 333, having at least one sealant 230, along with a protective sanded adhesive tape 240, providing additional adherence security.

It should be understood that the sealant 230, could be any commercially available sealant 230, that is used in the waterproofing industry, such as, for example, Aussie Seal M.

It should be appreciated that any of the embodiments illustrated above could optionally use at least one pressure source 81, such as, for example, a steel or rubber roller 81, that could be applied over the seam or gap 31, (FIGS. 6, 24, 25, 26) or the overlap 51, 61, (FIGS. 5, 6, 20, 21, 22, 23, 27, 28, 29, 30, 31), several times while applying significant pressure to completely, and securely bond the first inventive sheet membrane 193A, 200A, to the second inventive sheet membrane 193B, 200B. At least one pressure source 81, can also be used whenever a first inventive sheet or membrane 193A, 200A, is being mated or secured to a second inventive sheet or membrane 193B, 200B, such as, along an edge E1, E2, 10D, or selvedge E1, E2, 10D. For some applications, such as, for example, during cold or wet weather where a first at least one inventive sheet membrane 193A, 200A, for some reason is not adhering to a second at least one inventive sheet membrane 193B, 200B, one could optionally, and gently, use at least one securing force 81, such as, for example, a heat gun 81, or a welder 81, (such as, a Liester welder), which would help improve the adhesion between the two overlapping inventive sheet membranes 193A, 200A, and 193B, 200B, such as, for example, along the overlap 51, 61. Thus, it should be understood that the at least one securing force 81, could be selected from a group comprising a roller, steel roller, a rubber roller, a plastic roller, a heat gun, a welder, and combinations thereof, to name a few.

It should be appreciated that the peel strength of a standard or regular adhesive 12, 22, was between about 0.70 N/mm to about 1.00 N/mm, and an average of about 0.89 N/mm, whereas the inventive high strength or enhanced adhesive 112, 122, is between about 1.50 N/mm to about 2.00 N/mm, and an average of about 1.80 N/mm. Peel strength is measured by means of a peel test. During a peel test the materials are pulled apart at a constant speed. The average force required to pull the materials apart is then used in conjunction with the width measurement of the bond to determine the peel strength. Peel Strength Testing is generally used to measure the bond strength of a material, typically an adhesive. Peel Strength Testing is the average load per unit width of bond line required to separate bonded materials where the angle of separation is 180 degrees. Furthermore, peel test on samples were also done after exposure to the outside climatic elements for a period of 20 days, for both the standard or regular adhesive 12, 22, and the inventive high strength adhesive 112, 122, and it was discovered during the peel test that the peel strength of the standard or regular adhesive 12, 22, after 20 days was on an average about 1.36 N/mm, whereas the peel strength of the inventive high strength adhesive 112, 122, after 20 days was on an average about 2.32 N/mm. Thus, one can clearly see that the new inventive high strength adhesive 112, 122, is substantially superior than the standard or regular adhesive 12, 22, and that this high strength adhesion eliminates or prevents or substantially reduces the creation of air pockets, or undulations, or separations 150.

For some applications, such as, for example, the first inventive sheet membrane 23A, has to be secured to a second inventive sheet membrane 23B, such as, for example, shown in FIGS. 5-9, and elsewhere, it is preferred that a steel or rubber roller 81, is rolled or passed over the lap or the joint area 31, 51, 61, several times while applying pressure to ensure proper adhesion between the first at least one inventive sheet membrane 23A, and the second at least one inventive sheet membrane 23B, that are being joined at their respective edges. For some applications, such as, for example, during cold or wet weather where a first at least one inventive sheet membrane 23A, for some reason is not adhering to a second at least one inventive sheet membrane 23B, one could optionally, and gently, use a heat gun 81, or welder 81, (such as, a Liester welder), which will help improve the adhesion between the two overlapping inventive sheet membranes 23A, and 23B.

The inventive sheet membrane 23, comprises of at least one sheet membrane 10, having at least one layer of at least one first adhesive layer 12, along with the at least one layer of at least one reflectivity granular particle layer 14, such as, for example, an Aussie Skin 550G, Aussie Skin 560G, inventive sheet membrane 23, is very thick, such as, for example, about 1.2 mm thick. The at least one layer of the at least one sheet membrane 10, with at least one first adhesive layer 12, having at least one layer of reflectivity granular particle layer 14, such as, for example, the Aussie Skin 550G, Aussie Skin 560G, inventive sheet membrane 23, preferably has a thickness from say between about 20 mils, to about 300 mils. For some applications one could also use a high-density polyethylene (HDPE) sheet membrane 10, having at least one layer of at least one first adhesive layer 12, along with the at least one layer of at least one reflectivity granular particle layer 14, such as, for example, Aussie Skin 550G, Aussie Skin 560G, inventive sheet membrane 23, and having different thicknesses, depending on the job requirements, and ranging, for example, from about 0.5 mm to about 3.5 mm thick, that can be secured to the exposed face of the receiving surface 42, 44, such as, for example, a foundation 42, or a wall 44.

For areas where at least one sheet membrane 10, having at least one layer of at least one first adhesive layer 12, along with the at least one layer of at least one reflectivity granular particle layer 14, such as, for example, Aussie Skin 550G sheet or layer, Aussie Skin 560G inventive sheet membrane 23, is being joined to another sheet membrane 10, having at least one layer of at least one first adhesive layer 12, along with the at least one layer of at least one reflectivity granular particle layer 14, such as, at a gap or seam 31, it is preferred that the area that is going to be overlapped 31, 51, 61, has clean surfaces. Before bonding the next layer of the at least one sheet membrane 10, with first adhesive layer 12, with the at least one layer of at least one reflectivity granular particle layer 14, to an existing layer, or an adjacent layer, or a second layer, of at least one sheet membrane with adhesive, one should remove the release sheet or film(s) from the factory laps. It is preferred the next or second at least one inventive sheet membrane 23, be installed and mated with the previous or already installed at least one inventive sheet membrane 23, and has, for example, a minimum of say, between about 2.0 inches to about 6.0 inches overlap 51, 61. For some applications it is preferred that at least one pressure source 81, such as, for example, a steel or rubber roller 81, is roiled or passed over the lap or the joint area or seam 66, and along the gap or seam 31, or the joint area 31, 51, 61, several times while applying pressure 81, to ensure proper adhesion between the first at least one inventive sheet membrane 23A, and the second at least one inventive sheet membrane 23B, that are being joined at their respective edges. For some applications, such as, for example, during cold or wet weather where a first at least one inventive sheet membrane 23A, for some reason is not adhering to a second at least one inventive sheet membrane 23B, one could optionally, and gently, use a heat gun 81, or welder 81, (such as, a Liester welder), which will help improve the adhesion between the two overlapping inventive sheet membranes or layers 23A, and 23B. It should be understood that the at least one pressure source 81, can be similarly used to secure a first inventive sheet or membrane 23, 23A, 33, 43, 53, 53A, to a second inventive sheet or membrane 23, 23B, 33, 43, 53, 53B.

The reflectivity as mentioned herein can be measured in a number of ways, such as, for example, using a Novo Shade Duo Reflectivity Meter. The Novo Shade Duo Reflectometer has 3 distinct modes of operation, each using the 0/45 geometry, which are, (a) measuring the shade of a surface on a greyscale, (b) measuring the substrate opacity/hiding power, and (c) measuring the substrate cleanliness. Once a sample is placed in the reflectivity meter, within a fraction of a second, the result is displayed in "percentage Reflectance". For the purposes of understanding, a appreciably black sample would be displayed as "0 percent Reflectance", while a appreciably bright white sample would result in a reading by the reflectivity meter as being "100 percent Reflectance". Only shading is measured, irrespective of color, and is commonly referred to as percent whiteness or percent darkness. The first or reflective surface 14A, of the inventive sheet membrane or layer of the present invention 23, 33, 43, 53, 63, 73, 83, 93, 103, has a whiteness or brightness value that is less than about 50 or below 55 percent reflectivity, and preferably between about 35 percent reflectivity to about 50 or below 55 percent reflectivity. Even though the Novo Shade Duo Reflectivity Meter is extremely accurate however, during the mass production of the at least one layer of at least one reflectivity granular particle layer 14, one should take into account the batch variances, and thus one could have a variation or standard deviation for the reflectivity percentage between each batch or at least one layer of at least one reflectivity granular particle layer 14, and another layer of at least one reflectivity granular particle layer 14.

Another Reflectivity measuring device currently in use in the market is made by Rhopoint Instruments, Ltd., and is called Model Number Novo-Shade Duo+(Novo-Shade DuoPlus), which is a dual function 45/0 degree reflectometer. The Novo-Shade DuoPlus has many features, such as, for example it measures the Reflectivity, based on measuring the shade of a surface on a greyscale, and also allows the measuring of the substrate opacity/hiding power, and it can also measure the substrate cleanliness. And, thus one can easily use the Novo-Shade DuoPlus to check that the reflectivity of the at least one layer of at least one reflectivity granular particle layer is about 50 or below 55 percent reflectivity, and preferably between about 35 percent reflectivity, to below 50 or 55 percent reflectivity.

Shotcrete 13, 15, or sprayed concrete 13, 15, is concrete 13, 15, or mortar 13, 15, conveyed through a hose (not shown) and pneumatically projected at high velocity onto a surface 42, 44, as a construction technique. For some applications the sprayed concrete 13, 15, or shotcrete 13, 15, is typically reinforced by conventional securing means 47, such as, for example, steel rods, steel mesh, fibers, and combinations thereof, or, for example, a rebar cage. Shotcrete 13, 15, can be placed, and compacted at the same time, due to the force with the nozzle, and it can be sprayed onto any type or shape of surface 42, 44, including vertical surface 44, horizontal surface 42, or overhead areas (not shown), such as, along a roof or ceiling, which is done in a similar manner as the application along the horizontal floor 42, or a vertical wall 44, and would be well known to a person skilled in the art.

For some applications, such as, below the water table 48, a drain board 18, may be substituted with an approved protection layer 18, as long as the approved protection layer 18, is providing sufficient protection for the inventive sheet waterproofing membrane 23, 33, 43, 53, 63, 73, 83, 93, 103, installed on the building or structure 54.

As stated earlier that this invention illustrated in FIGS. 1-31, can be used, such as, for example, especially in a high risk conditions, where, for example, the building 54, or floor 42, or wall 44, or structure 42, 44, 54, is going to be built in a water table 48, area 50, and/or exposed to periodic or on-going hydrostatic pressure 48.

The sheet membrane or layer 10, has a first or top or upper membrane surface 10A, and a second or lower or bottom membrane surface 10B, and wherein the second membrane surface 10B, has a distinct surface, and wherein the distinct surface is selected from a group comprising of a textured surface, a light textured surface, an embossed surface, a lightly embossed surface, an undulating surface, smooth surface, and combinations thereof, to name a few.

The present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A below grade, blind side, waterproofing sheet membrane with adhesive and reflectivity granular particle layer to fully bond to concrete/shotcrete, comprising:
   (a) at least one sheet membrane having a first membrane surface, and a second membrane surface;
   (b) at least one first adhesive layer having a first adhesive surface, and a second adhesive surface, and wherein said second adhesive surface is in secure contact with at least a portion of said first membrane surface;
   (c) at least one layer of at least one reflectivity granular particle layer, having a first particle layer surface, and a second particle layer surface, and wherein said second particle layer surface is in secure contact with at least a portion of said first adhesive surface, and wherein reflectivity of said at least one layer of at least one reflectivity granular particle layer is below 55 percent reflectivity; and
   (d) wherein at least a portion of said at least one sheet membrane has at least one layer of a high strength adhesive.

2. The below grade, blind side, waterproofing sheet membrane with adhesive and reflectivity granular particle layer to fully bond to concrete/shotcrete of claim 1, wherein peel strength of said high strength adhesive is between about 1.50 N/mm to about 2.00 N/mm.

3. The below grade, blind side, waterproofing sheet membrane with adhesive and reflectivity granular particle layer to fully bond to concrete/shotcrete of claim 1, wherein said reflectivity is preferably between about 35 percent reflectivity, to below 55 percent reflectivity.

4. The below grade, blind side, waterproofing sheet membrane with adhesive and reflectivity granular particle layer to fully bond to concrete/shotcrete of claim 1, wherein said at least one reflectivity granular particle layer comprises of dyed granular particles.

5. The below grade, blind side, waterproofing sheet membrane with adhesive and reflectivity granular particle layer to fully bond to concrete/shotcrete of claim 1, wherein said at least one reflectivity granular particle layer is selected from a group consisting of blue color granular particles, gray color granular particles, and combinations thereof.

6. The below grade, blind side, waterproofing sheet membrane with adhesive and reflectivity granular particle layer to fully bond to concrete/shotcrete of claim 1, wherein said at least one layer of at least one reflectivity granular particle layer is selected from a group consisting of sand layer, partially hydrated cement granules layer, a gray cement layer, a white cement layer that has been dyed to provide reflectivity, a tinted granules layer, a gray sand layer, a black sand layer, a red sand layer, and combinations thereof.

7. The below grade, blind side, waterproofing sheet membrane with adhesive and reflectivity granular particle layer to fully bond to concrete/shotcrete of claim 1, wherein said second membrane surface has a distinct surface, and wherein said distinct surface is selected from a group consisting of a textured surface, a light textured surface, an embossed surface, a lightly embossed surface, an undulating surface, smooth surface, and combinations thereof.

8. The below grade, blind side, waterproofing sheet membrane with adhesive and reflectivity granular particle layer to fully bond to concrete/shotcrete of claim 1, wherein said at least one sheet membrane is made from a material selected from a group consisting of a high-density polyethylene (HDPE) material, a thermoplastic polyolefin (TPO) material, and combinations thereof.

9. The below grade, blind side, waterproofing sheet membrane with adhesive and reflectivity granular particle layer to fully bond to concrete/shotcrete of claim 1, wherein said at least one sheet membrane is made from a material selected from a group consisting of a high-density polyethylene (HDPE) material, a thermoplastic polyolefin (TPO) material, and combinations thereof, and wherein thickness of said at least one sheet membrane is preferably between about 0.50 mm and about 3.50 mm.

10. The below grade, blind side, waterproofing sheet membrane with adhesive and reflectivity granular particle layer to fully bond to concrete/shotcrete of claim 1, wherein an end portion of said first adhesive surface has removeably secured thereto at least one first protective release sheet.

11. The below grade, blind side, waterproofing sheet membrane with adhesive and reflectivity granular particle layer to fully bond to concrete/shotcrete of claim 1, wherein an end portion of said first adhesive surface has removeably secured thereto at least one first protective release sheet, and wherein said end portion is one of factory edge, and selvedge.

12. The below grade, blind side, waterproofing sheet membrane with adhesive and reflectivity granular particle layer to fully bond to concrete/shotcrete of claim 1, wherein an end portion of said first adhesive surface has removeably secured thereto at least one first protective release sheet, and wherein said at least one first protective release sheet is adjacent and substantially planar with said at least one layer of at least one reflectivity granular particle layer.

13. The below grade, blind side, waterproofing sheet membrane with adhesive and reflectivity granular particle layer to fully bond to concrete/shotcrete of claim 1, further comprising:
(e) at least one detail strip having a first detail strip surface having a first detail adhesive layer, and a second detail strip surface; and
(f) wherein at least a portion of said first detail adhesive layer is in secure contact with at least a portion of said second membrane surface.

14. The below grade, blind side, waterproofing sheet membrane with adhesive and reflectivity granular particle layer to fully bond to concrete/shotcrete of claim 13, wherein at least one pressure source is applied to secure said at least one second membrane surface to said at least one detail strip.

15. The below grade, blind side, waterproofing sheet membrane with adhesive and reflectivity granular particle layer to fully bond to concrete/shotcrete of claim 13, wherein at least one pressure source is applied to secure said at least one second membrane surface to said at least one detail strip, and wherein said at least one pressure source is selected from a group consisting of a roller, steel roller, a rubber roller, a plastic roller, a heat gun, a welder, and combinations thereof.

16. The below grade, blind side, waterproofing sheet membrane with adhesive and reflectivity granular particle layer to fully bond to concrete/shotcrete of claim 1, further comprising:
(e) at least one detail strip having a first detail strip surface having a first detail adhesive layer, and a second detail strip surface;
(f) wherein at least a portion of said first detail adhesive layer is in secure contact with at least a portion of said second membrane surface; and
(g) wherein at least a portion of said first detail adhesive layer is in secure contact with at least a portion of a second membrane surface of a second sheet membrane.

17. The below grade, blind side, waterproofing sheet membrane with adhesive and reflectivity granular particle layer to fully bond to concrete/shotcrete of claim 1, further comprising:
(e) at least one second adhesive layer having a top adhesive surface, and a bottom adhesive surface; and
(f) wherein said top adhesive surface is securely secured to at least a portion of said second membrane surface.

18. The below grade, blind side, waterproofing sheet membrane with adhesive and reflectivity granular particle layer to fully bond to concrete/shotcrete of claim 1, further comprising:
(e) at least one second adhesive layer having a top adhesive surface, and a bottom adhesive surface;
(f) wherein said top adhesive surface is securely secured to at least a portion of at least one second membrane surface; and
(g) wherein at least one second protective release sheet is removeably secured to said bottom adhesive surface of said at least one second adhesive layer.

19. The below grade, blind side, waterproofing sheet membrane with adhesive and reflectivity granular particle layer to fully bond to concrete/shotcrete of claim 1, further comprising:
(e) at least one double sided adhesive tape having a top adhesive tape surface, and a bottom adhesive tape surface;
(f) wherein said top adhesive tape surface is securely secured to at least a portion of said second membrane surface; and
(g) wherein said bottom adhesive tape surface is securely secured to at least a portion of a first membrane surface of a second sheet membrane.

20. The below grade, blind side, waterproofing sheet membrane with adhesive and reflectivity granular particle layer to fully bond to concrete/shotcrete of claim 1, further comprising:
(e) at least one double sided adhesive tape having a top adhesive tape surface, and a bottom adhesive tape surface; and
(f) wherein said bottom adhesive tape surface is securely secured to at least a portion of said at least one layer of at least one reflectivity granular particle layer.

21. A method of forming a below grade, blind side, waterproofing sheet membrane with adhesive and reflectivity granular particle layer to fully bond to concrete/shotcrete, comprising the steps of:
(a) taking at least one sheet membrane having a first membrane surface, and a second membrane surface;
(b) applying at least one first adhesive layer having a first adhesive surface, and a second adhesive surface, onto said at least one sheet membrane, and wherein said second adhesive surface is in secure contact with at least a portion of said first membrane surface;
(c) applying at least one layer of at least one reflectivity granular particle layer, having a first particle layer surface, and a second particle layer surface, over at least a portion of said at least one first adhesive layer, and wherein said second particle layer surface is in secure contact with at least a portion of said first adhesive surface, and wherein reflectivity of said at least one layer of at least one reflectivity granular particle layer is below 55 percent reflectivity; and
(d) wherein at least a portion of said at least one sheet membrane has at least one layer of a high strength adhesive.

22. A method of forming a below grade, blind side, waterproofing sheet membrane with adhesive and reflectivity granular particle layer to fully bond to concrete/shotcrete, comprising the steps of:
(a) taking the waterproofing sheet membrane with adhesive and reflectivity granular particle layer of claim 1, and placing it against at least one structure, such that said second membrane surface of said at least one sheet membrane is in physical contact with said at least one structure, and wherein said first particle layer surface of said at least one layer of at least one reflectivity granular particle layer is exposed;

(b) applying at least one layer of one of concrete and shotcrete over at least a portion of said first particle layer surface of said at least one layer of at least one reflectivity granular particle layer; and (c) wherein at least a portion of said at least one sheet membrane has at least one layer of a high strength adhesive.

* * * * *